(12) United States Patent
Noh et al.

(10) Patent No.: US 11,476,918 B2
(45) Date of Patent: Oct. 18, 2022

(54) DEVICE AND METHOD TRANSMITTING DATA BASED ON NON-CODEBOOK IN WIRELESS COMMUNICATION SYSTEM

(71) Applicant: Samsung Electronics Co., Ltd., Suwon-si (KR)

(72) Inventors: Jeehwan Noh, Suwon-si (KR); Taeyoung Kim, Seoul (KR); Hyunil Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 16/496,929

(22) PCT Filed: Mar. 22, 2018

(86) PCT No.: PCT/KR2018/003332
§ 371 (c)(1),
(2) Date: Sep. 23, 2019

(87) PCT Pub. No.: WO2018/174580
PCT Pub. Date: Sep. 27, 2018

(65) Prior Publication Data
US 2020/0091978 A1    Mar. 19, 2020

(30) Foreign Application Priority Data
Mar. 23, 2017  (KR) ......................... 10-2017-0037102

(51) Int. Cl.
*H04B 7/08*     (2006.01)
*H04B 7/0404*   (2017.01)
(Continued)

(52) U.S. Cl.
CPC ........... *H04B 7/088* (2013.01); *H04B 7/0404* (2013.01); *H04B 7/0456* (2013.01);
(Continued)

(58) Field of Classification Search
CPC .... H04B 7/088; H04B 7/0822; H04B 7/0456; H04B 7/0686; H04B 7/0689;
(Continued)

(56) References Cited

U.S. PATENT DOCUMENTS

2013/0039304 A1* 2/2013 Pan ................... H04W 72/1289
                                                            370/329
2016/0080060 A1* 3/2016 Yu ........................ H04B 7/0626
                                                            455/452.2
(Continued)

FOREIGN PATENT DOCUMENTS

| CN | 106134236 A | 11/2016 |
| CN | 106452541 A | 2/2017 |
| KR | 10-2018-0091351 A | 8/2018 |

OTHER PUBLICATIONS

Gao, Qiubin et al., "Utilization of Channel Reciprocity in Advanced MIMO System", IEEE Xplore, 2010 5th International ICST Conference on Communications and Networking in China, Published Aug. 1, 2010, pp. 1-5. (Year: 2010).*

(Continued)

*Primary Examiner* — Joshua Kading

(57) ABSTRACT

Disclosed is a 5th generation (5G) or pre-5G communication system for supporting a data transmission rate higher than that of a 4th generation (4th) communication system such as long term evolution (LTE). A device of a terminal, according to various embodiments of the disclosure, can comprise at least one processor and at least one transceiver, which: receives, from a base station, indication information which is determined according to whether channel reciprocity with the base station is satisfied and which is for controlling a beamforming operation of the terminal; and receives, from the base station, a reference signal and transmits uplink data to the base station on the basis of the indication information and the reference signal.

20 Claims, 30 Drawing Sheets

(51) Int. Cl.
*H04W 72/04* (2009.01)
*H04B 7/06* (2006.01)
*H04B 7/0456* (2017.01)

(52) U.S. Cl.
CPC ......... *H04B 7/0617* (2013.01); *H04B 7/0639* (2013.01); *H04B 7/0686* (2013.01); *H04B 7/0689* (2013.01); *H04B 7/0695* (2013.01); *H04B 7/0822* (2013.01); *H04B 7/0871* (2013.01); *H04W 72/042* (2013.01); *H04W 72/046* (2013.01); *H04W 72/0493* (2013.01)

(58) Field of Classification Search
CPC .. H04B 7/0695; H04B 7/0404; H04B 7/0617; H04B 7/0639; H04B 7/0871; H04W 72/1257; H04W 72/1231; H04W 72/1289; H04W 72/1268; H04W 72/0493; H04W 72/046; H04W 72/042
See application file for complete search history.

(56) References Cited

U.S. PATENT DOCUMENTS

| | | | |
|---|---|---|---|
| 2016/0269158 | A1 | 9/2016 | Soriaga et al. |
| 2018/0040964 | A1* | 2/2018 | Benjebbour ........... H01Q 21/06 |
| 2018/0102827 | A1* | 4/2018 | Noh ..................... H04B 7/0695 |
| 2018/0227898 | A1 | 8/2018 | Noh et al. |
| 2018/0262242 | A1* | 9/2018 | Chakraborty ....... H04W 72/042 |
| 2019/0190569 | A1* | 6/2019 | Nayeb Nazar ....... H04B 7/0417 |
| 2019/0289476 | A1* | 9/2019 | Chen .................... H04B 7/0408 |
| 2020/0067581 | A1* | 2/2020 | Osawa .................. H04W 16/28 |
| 2020/0128586 | A1* | 4/2020 | Takahashi ............. H04W 36/24 |
| 2021/0119686 | A1* | 4/2021 | Tang .................... H04B 7/0695 |
| 2021/0120536 | A1* | 4/2021 | Gao ..................... H04W 72/12 |

OTHER PUBLICATIONS

ISA/KR, International Search Report and Written Opinion of the International Searching Authority, International Application No. PCT/KR2018/003332, dated Jun. 25, 2018, 10 pages.
Huawei, et al., "Discussion on UL MIMO transmission," R1-1608820, 3GPP TSG RAN WG1 Meeting #86bis, Lisbon, Portugal, Oct. 10-14, 2016, 5 pages.
Huawei, et al, "DL RS Design for NR Beam Management," R1-1611242, 3GPP TSG RAN WG1 Meeting #87, Reno, USA, Nov. 14-18, 2016, 5 pages.
Intel Corporation, "Discussion on UL Subband Precoding," R1-1609520, 3GPP TSG RAN WG1 Meeting #86bis, Lisbon, Portugal, Oct. 10-14, 2016, 4 pages.
Qualcomm Incorporation, "Uplink MIMO Transmission Schemes," R1-1610148, 3GPP TSG RAN WG1 Meeting #86bis, Lisbon, Portugal, Oct. 10-14, 2016, 4 pages.
Zte, et al., "Beam related indication for DL and UL beam management," R1-1700123, 3GPP TSG RAN WG1 NR Ad-Hoc Meeting, Spokane, USA, Jan. 16-20, 2017, 7 pages.
The First Office Action dated May 28, 2021 in connection with Chinese Patent Application No. 201880031695.6, 17 pages.
Notice of Preliminary Rejection dated Jul. 29, 2021, in connection with Korean Patent Application No. 10-2017-0037102, 10 pages.
Ericsson, "On QCL for UL RS", 3GPP TSG-RAN WG1 #88, R1-1702693, Athens, Greece, Feb. 13-17, 2017, 3 pages.
Samsung, "UL Non-Codebook-Based Transmission", 3GPP TSG RAN WG1 88, R1-1702921, Athens, Greece, Feb. 13-17, 2017, 3 pages.
Notice of Patent Grant dated Feb. 11, 2022, in connection with Korean Application No. 10-2017-0037102, 3 pages.
Huawei, et al., "UL SRS design for CSI acquisition and beam management," R1-1700074, 3GPP TSG RAN WG1 NR Ad Hoc Meeting, Spokane, USA, Jan. 16-20, 2017, 8 pages.
Qualcomm Incorporated, "UL MIMO Transmission Schemes," R1-1700797, 3GPP TSG RAN WG1 RAN1 NR AdHoc, Spokane, USA, Jan. 16-20, 2017, 6 pages.

* cited by examiner

DEVICE AND METHOD TRANSMITTING DATA BASED ON NON-CODEBOOK IN WIRELESS COMMUNICATION SYSTEM

CROSS-REFERENCE TO RELATED APPLICATIONS

This application is a 371 National Stage of International Application No. PCT/KR2018/003332, filed Mar. 22, 2018, which claims priority to Korean Patent Application No. 10-2017-0037102, filed Mar. 23, 2017, the disclosures of which are herein incorporated by reference in their entirety.

BACKGROUND

1. Field

The present disclosure generally relates to a wireless communication system. In more detail, the present disclosure relates to a device and method for transmitting data in a wireless communication system.

2. Description of Related Art

To meet a demand for wireless data traffic that is on an increasing trend after the commercialization of 4th-generation (4G) communication systems, an effort to develop improved 5th-generation (5G) communication systems or pre-5G communication systems is being made. For this reason, the 5G communication systems or pre-5G communication systems are called beyond 4G network communication systems or post long term evolution (LTE) systems. To accomplish a high data transmission rate, the 5G communication systems are in consideration of implementation at a band of ultra-high frequency (mmWave) (for example, a band of 60 Giga Hertz (GHz)). To alleviate a path loss of radio waves at the ultra-high frequency band and increase a propagation distance of the radio waves, the 5G communication systems discussing beamforming, massive multiple input multiple output (MIMO), full dimensional—MIMO (FD-MIMO), array antenna, analog beamforming, and large scale antenna technologies.

Also, for the purpose of improvement of a system network, the 5G communication systems are achieving the development of technologies such as an evolved small cell, an advanced small cell, a cloud radio access network (cloud RAN), an ultra-dense network, device to device communication (D2D), wireless backhaul, a moving network, cooperative communication, coordinated multi-points (CoMP), received interference cancellation, etc.

In addition to this, the 5G systems are developing advanced coding modulation (ACM) schemes such as hybrid frequency shift keying and quadrature amplitude modulation (FQAM) and sliding window superposition coding (SWSC), and advanced connection technologies such as filter bank multi carrier (FBMC), non-orthogonal multiple access (NOMA), sparse code multiple access (SCMA), etc.

To overcome a problem of a path loss caused by a characteristic of a band of ultra-high frequency (e.g., mmWave), the 5G communication systems are being managed to increase a signal gain by using a beamforming technique. Accordingly, a way for managing reciprocity-based precoding in an environment of considering a system employing beamforming is being demanded.

SUMMARY

On the basis of the above-described discussion, the present disclosure provides a device and method for effectively determining a precoder in a wireless communication system.

Also, the present disclosure provides a device and method for transmitting data on the basis of a procedure which is determined according to beam correspondence and channel reciprocity in a wireless communication system.

Also, the present disclosure provides a device and method for transmitting indication information representing the satisfaction or non-satisfaction of beam correspondence or channel reciprocity in a wireless communication system.

Also, the present disclosure provides a device and method for transmitting an uplink reference signal through a previously determined downlink reception beam, or transmitting a downlink reference signal through a previously determined uplink reception beam in a wireless communication system.

Also, the present disclosure provides a device and method for transmitting uplink data through a previously determined downlink reception beam, or transmitting downlink data through a previously determined uplink transmission beam in a wireless communication system.

Also, the present disclosure provides a device and method for determining a measurement scheme for transmitting data in a wireless communication system.

Also, the present disclosure provides a device and method for representing a function of a preceding matrix indicator (PMI) in a wireless communication system.

Also, the present disclosure provides a device and method for indicating an uplink transmission scheme in a wireless communication system.

According to various embodiments of the present disclosure, a device of a terminal may include at least one processor, and at least one transceiver for receiving, from a base station, indication information which is determined according to whether channel reciprocity with the base station is satisfied and which is for controlling a beamforming operation of the terminal, and receiving a reference signal from the base station, and transmitting uplink data to the base station on the basis of the indication information and the reference signal.

According to various embodiments of the present disclosure, a device of a base station may include at least one processor and at least one transceiver for transmitting, to a terminal, indication information which is determined according to whether channel reciprocity with the terminal is satisfied and which is for controlling a beamforming operation of the terminal, and receiving, from the terminal, a reference signal, and transmitting downlink data to the terminal on the basis of the indication information and the reference signal.

According to various embodiments of the present disclosure, a method for operating in a terminal may include receiving, from a base station, indication information which is determined according to whether channel reciprocity with the base station is satisfied and which is for controlling a beamforming operation of the terminal, receiving, from the base station, a reference signal, and transmitting uplink data to the base station on the basis of the indication information and the reference signal.

According to various embodiments of the present disclosure, a method for operating in a base station may include transmitting, to a terminal, indication information which is determined according to whether channel reciprocity with the terminal is satisfied and which is for controlling a beamforming operation of the terminal, receiving a reference signal from the terminal, and transmitting downlink data to the terminal on the basis of the indication information and the reference signal.

A device and method of various embodiments of the present disclosure may determine or identify a precoder and perform a beamforming communication, by using beam correspondence or channel reciprocity.

Effects which can be acquired by the disclosure are not limited to the above described effects, and other effects that have not been mentioned may be clearly understood by those skilled in the art from the following description.

DETAILED DESCRIPTION

Figure 1:
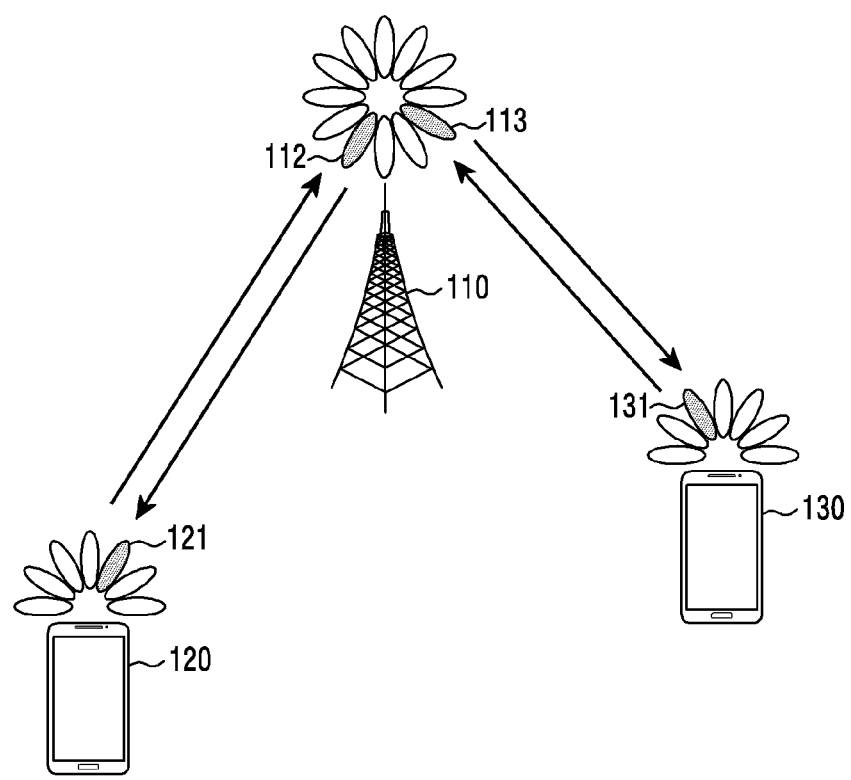
FIG. 1 illustrates a wireless communication system according to various embodiments of the present disclosure.

The terms used in the present disclosure are used to just describe specific embodiments, and may have not an intention to limit the scope of other embodiments. The expression of a singular form may include the expression of a plural form unless otherwise dictating clearly in context. The terms used herein including the technological or scientific terms may have the same meanings as those generally understood by a person having ordinary skill in the art mentioned in the present disclosure. Among the terms used in the present disclosure, the terms defined in a general dictionary may be interpreted as the same or similar meanings as the contextual meanings of a related technology, and are not interpreted as ideal or excessively formal meanings unless defined clearly in the present disclosure. According to cases, even the terms defined in the present disclosure may not be construed as excluding embodiments of the present disclosure.

In various embodiments of the present disclosure described below, a hardware access method is explained as an example. However, various embodiments of the present disclosure include a technology that uses all of hardware and software and therefore, various embodiments of the present disclosure do not exclude a software based access method.

Various embodiments of the present document are mentioned below with reference to the accompanying drawings. It should be appreciated that an embodiment and the terms used therein are not intended to limit the technology set forth therein to a particular embodiment form, and include various modifications, equivalents, and/or alternatives of a corresponding embodiment. In relation to a description of the drawing, like reference symbols may be used for like components. The expression of a singular form may include the expression of a plural form unless otherwise dictating clearly in context.

In the present document, the expression "A or B", "at least one of A and/or B" or the like may include all available combinations of words enumerated together. The expressions "a first", "a second", "the first", "the second", etc. may use corresponding constituent elements irrespective of order and/or importance, and are used to distinguish a constituent element from another without limiting the corresponding constituent element. When it is mentioned that any (e.g., a first) component is "(operatively or communicatively) coupled with/to" or is "connected to" another (e.g., a second) component, the any component may be directly coupled to the another component, or be coupled via a further component (e.g., a third component).

In the present document, the expression "configured (or set) to~" may be used interchangeably with, for example, "suitable for~", "having the capacity to~", "adapted to~", "made to~", "capable of~" or "designed to~" in a hardware or software manner in accordance to circumstances. In some context, the expression "device configured to~" may represent that the device is "capable of~" together with other devices or parts. For example, the phrase "processor configured (or set) to perform A, B, and C" may represent a dedicated processor (e.g., embedded processor) for performing a corresponding operation, or a generic-purpose processor (e.g., a central processing unit (CPU) or an application processor) capable of performing corresponding operations by executing one or more software programs stored in a memory device.

Below, the present disclosure relates to device and method for performing precoding in a non-codebook based precoding scheme in a wireless communication system. In detail, the present disclosure explains a technology for performing precoding by using channel reciprocity in a beamforming based wireless communication system.

In the following description, the term denoting a signal, the term denoting a channel, the term denoting control information, the term denoting network entities, the term denoting a component of a device, etc are illustrated for description convenience's sake. Accordingly, the present disclosure is not limited to the terms described later, and may use other terms having equivalent technological meanings.

Also, the present disclosure explains various embodiments by using the terms used in some communication standards (e.g., 3rd generation partnership project (3GPP)), but this is just an example for explanation. Various embodiments of the present disclosure may be easily deformed and applied even in other communication systems.

FIG. 1 illustrates a wireless communication system according to various embodiments of the present disclosure. FIG. 1 exemplifies a base station 110, a terminal 120, and a terminal 130 as some of nodes using a wireless channel in the wireless communication system. FIG. 1 illustrates only one base station, but may further include another base station which is the same as or similar with the base station 110.

The base station 110 is a network infrastructure which provides wireless connection to the terminals 120 and 130. The base station 110 has coverage which is defined as a specific geographical area on the basis of a distance capable of transmitting a signal. The base station 110 may be denoted as, besides the base station, an 'access point (AP)', an 'eNodeB (eNB)', a '5th generation node', a 'wireless point', a 'transmission/reception point (TRP)' or other terms having technological meanings equivalent to these.

Each of the terminal 120 and the terminal 130, a device used by a user, performs communication with the base station 110 through a wireless channel. According to cases, at least one of the terminal 120 and the terminal 130 may be managed without user's engagement. That is, at least one of the terminal 120 and the terminal 130, a device performing machine type communication (MTC), may not be carried by the user. Each of the terminal 120 and the terminal 130 may be denoted as, besides the terminal, a 'user equipment (UE)', a 'mobile station', a 'subscriber station', a 'remote terminal', a 'wireless terminal', or a 'user device' or other terms having technological meanings equivalent to these.

The base station 110, the terminal 120, and the terminal 130 may transmit and receive a wireless signal at a band of mmWave (e.g., 28 GHz, 30 GHz, 38 GHz, and 60 GHz). At this time, for the sake of improvement of a channel gain, the base station 110, the terminal 120 and the terminal 130 may perform beamforming. Here, the beamforming includes transmission beamforming and reception beamforming. That is, the base station 110, the terminal 120 and the terminal 130 may grant directivity to a transmission signal or a reception signal. For this, the base station 110 or the terminal 120 or 130 may select a serving beam through a beam search or beam management procedure. After the serving beam is selected, subsequent communication may be performed through a resource which is in a quasi co-located (QCL) relation with a resource of transmitting the serving beam. The base station 110 and the terminals 120 and 130 may select serving beams 112, 113, 121 and 131 through the beam search procedure.

When large-scale characteristics of a channel forwarding a symbol on a first antenna port are inferred from a channel forwarding a symbol on a second antenna port, it may be evaluated that the first antenna port and the second antenna port are in a QCL relation. For example, the large-scale characteristics may include at least one of a delay spread, Doppler spread, Doppler shift, an average gain, an average delay, and a spatial receiver parameter.

Figure 2:
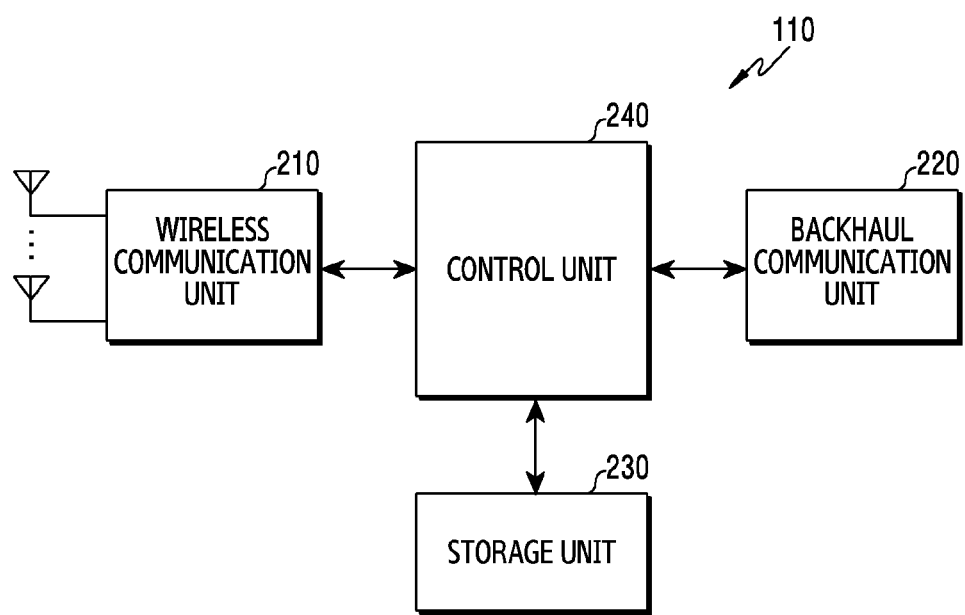
FIG. 2 illustrates a construction of a base station in a wireless communication system according to various embodiments of the present disclosure.

FIG. 2 illustrates a construction of a base station in a wireless communication system according to various embodiments of the present disclosure. The construction exemplified in FIG. 2 may be understood as a construction of the base station 110. The terms ' . . . unit', ' . . . er', etc. used below present the unit of processing at least one function or operation. These terms may be implemented by hardware, software or a combination of hardware and software.

Referring to FIG. 2, the base station 110 includes a wireless communication unit 210, a backhaul communication unit 220, a storage unit 230, and a control unit 240.

The wireless communication unit 210 performs functions for transceiving a signal through a wireless channel. For example, the wireless communication unit 210 performs a function of conversion between a baseband signal and a bit stream in compliance with the physical layer standard of a system. For example, at data transmission, the wireless communication unit 210 generates complex symbols by encoding and modulating a transmission bit stream. Also, at data reception, the wireless communication unit 210 restores a reception bit stream by demodulating and decoding a baseband signal. Also, the wireless communication unit 210 up converts a baseband signal into a radio frequency (RF) band signal and then transmits the RF band signal through an antenna, and down converts an RF band signal received through the antenna into a baseband signal.

For this, the wireless communication unit 210 may include a transmission filter, a reception filter, an amplifier, a mixer, an oscillator, a digital to analog converter (DAC), an analog to digital converter (ADC), etc. Also, the wireless communication unit 210 may include a plurality of transceiving paths. Further, the wireless communication unit 210 may include at least one antenna array comprised of a plurality of antenna elements. In aspect of hardware, the wireless communication unit 210 may be comprised of a digital unit and an analog unit, and the analog unit may be comprised of a plurality of sub-units according to an operation power, an operation frequency, etc.

The wireless communication unit 210 transmits and receives a signal as mentioned above. Accordingly to this, the entire or part of the wireless communication unit 210 may be denoted as a 'transmitting unit', a 'receiving unit' or a 'transceiving unit'. Also, in the following description, transmission and reception performed through a wireless channel are used as a meaning including that the aforementioned processing is performed by the wireless communication unit 210.

The backhaul communication unit 220 provides an interface for performing communication with other nodes in a network. That is, the backhaul communication unit 220 converts a bit stream transmitted from the base station 110 to another node, for example, another connection node, another base station, an upper node, a core network, etc., into a physical signal, and converts a physical signal received from another node, into a bit stream.

The storage unit 230 stores data such as a basic program for an operation of the base station 110, an application program, setting information, etc. The storage unit 230 may consist of a volatile memory, a non-volatile memory, or a combination of the volatile memory and the non-volatile memory. And, in response to a request of the control unit 240, the storage unit 230 provides the stored data.

The control unit 240 controls the general operations of the base station 110. For example, the control unit 240 may transmit and receive a signal through the wireless communication unit 210 or the backhaul communication unit 220. Also, the control unit 240 records data in the storage unit 230, and reads. And, the control unit 240 may perform functions of a protocol stack required in the communication standard. For this, the control unit 240 may include at least one processor. According to various embodiments, the control unit 240 may include a precoder calculation unit. Here, the precoder calculation unit, an instruction set or code stored in the storage unit 230, may be an instruction/code at least temporarily resided in the control unit 240 or a storage space storing the instruction/code, or be a part of a circuitry configuring the control unit 240. For example, the control unit 240 may control the base station 110 to perform operations of various embodiments described later.

Figure 3:
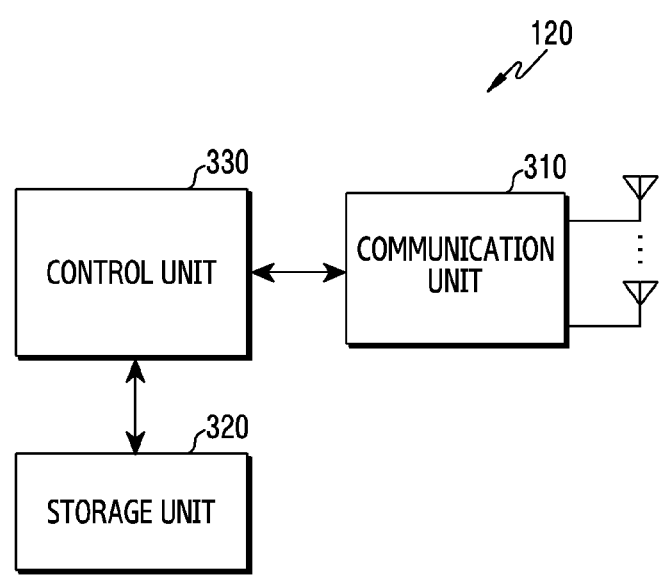
FIG. 3 illustrates a construction of a terminal in a wireless communication system according to various embodiments of the present disclosure.

FIG. 3 illustrates a construction of a terminal in a wireless communication system according to various embodiments of the present disclosure. The construction exemplified in FIG. 3 may be understood as a construction of the terminal 120. The terms '... unit', '... er', etc. used below represent the unit of processing at least one function or operation. These terms may be implemented by hardware, software or a combination of hardware and software.

Referring to FIG. 3, the terminal 120 includes a communication unit 310, a storage unit 320, and a control unit 330.

The communication unit 310 performs functions for transceiving a signal through a wireless channel. For example, the communication unit 310 performs a function of conversion between a baseband signal and a bit stream in compliance with the physical layer standard of a system. For example, at data transmission, the communication unit 310 generates complex symbols by encoding and modulating a transmission bit stream. Also, at data reception, the communication unit 310 restores a reception bit stream by demodulating and decoding a baseband signal. Also, the communication unit 310 up converts a baseband signal into an RF band signal and then transmits the RF band signal through an antenna, and down converts an RF band signal received through the antenna into a baseband signal. For example, the communication unit 310 may include a transmission filter, a reception filter, an amplifier, a mixer, an oscillator, a DAC, an ADC, etc.

Also, the communication unit 310 may include a plurality of transceiving paths. Furthermore, the communication unit 310 may include at least one antenna array comprised of a plurality of antenna elements. In aspect of hardware, the communication unit 310 may be comprised of a digital circuitry and an analog circuitry (e.g., a radio frequency integrated circuit (RFIC)). Here, the digital circuitry and the analog circuitry may be implemented as one package. Also, the communication unit 310 may include a plurality of RF chains. Furthermore, the communication unit 310 may perform beamforming.

Also, the communication unit 310 may include mutually different communication modules so as to process mutually different frequency-band signals. Furthermore, the communication unit 310 may include a plurality of communication modules in order to support a mutually different plurality of wireless connection technologies. For example, the mutually different wireless connection technologies may include Bluetooth low energy (BLE), wireless fidelity (Wi-Fi), WiFi gigabyte (WiGig), a cellular network (e.g., Long Term Evolution (LTE), etc. Also, mutually different frequency bands may include a super high frequency (SHF) (e.g., 2.5 GHz and 5 GHz) band, and/or a millimeter (mm) wave (e.g., 60 GHz) band.

The communication unit 310 transmits and receives a signal as mentioned above. Accordingly to this, the entire or part of the communication unit 310 may be denoted as a 'transmitting unit', a 'receiving unit' or a 'transceiving unit'. Also, in the following description, transmission and reception performed through a wireless channel are used as a meaning including that the aforementioned processing is performed by the communication unit 310.

The storage unit 320 stores data such as a basic program for an operation of the terminal 120, an application program, setting information, etc. The storage unit 320 may consist of a volatile memory, a non-volatile memory, or a combination of the volatile memory and the non-volatile memory. And, in response to a request of the control unit 330, the storage unit 320 provides the stored data.

The control unit 330 controls the general operations of the terminal 120. For example, the control unit 330 transmits and receives a signal through the communication unit 310. Also, the control unit 330 records data in the storage unit 320, and reads. And, the control unit 330 may perform functions of a protocol stack required in the communication standard. For this, the control unit 330 may include at least one processor or micro processor, or be part of the processor. Also, part of the communication unit 310 and the control unit 330 may be denoted as a communication processor (CP). Particularly, in accordance with various embodiments, the control unit 330 controls the terminal 120 to calculate a precoder and by applying this, generate an uplink data symbol. For example, the control unit 330 may control the terminal 120 to perform operations of various embodiments described later.

Figure 4A:
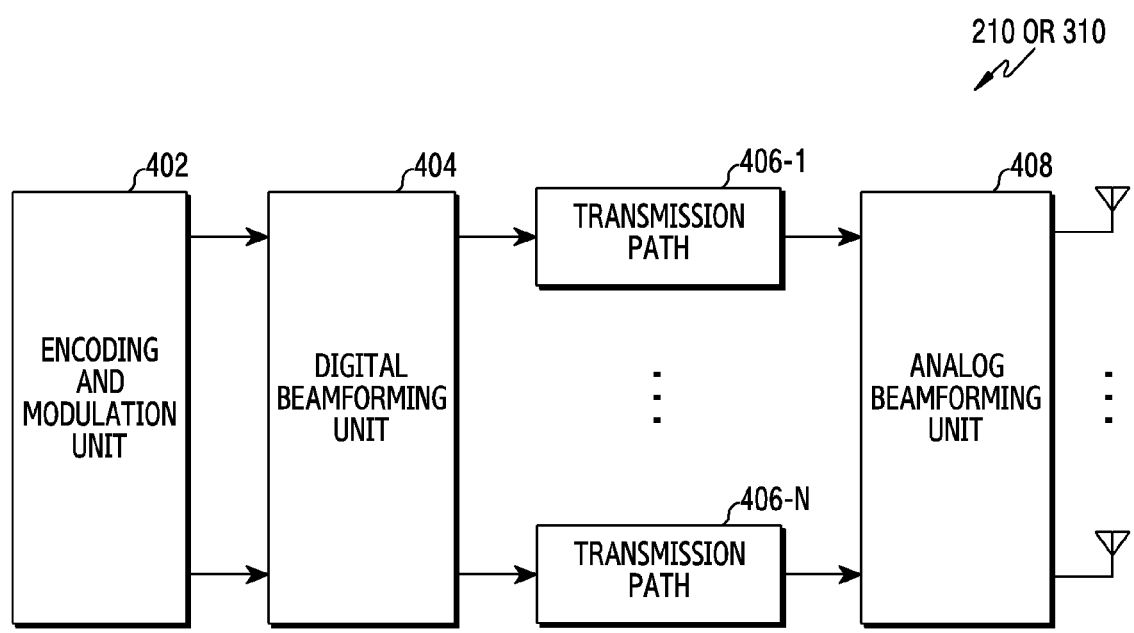
FIG. 4A to FIG. 4C illustrate a construction of a communication unit in a wireless communication system according to various embodiments of the present disclosure.
Figure 4B:
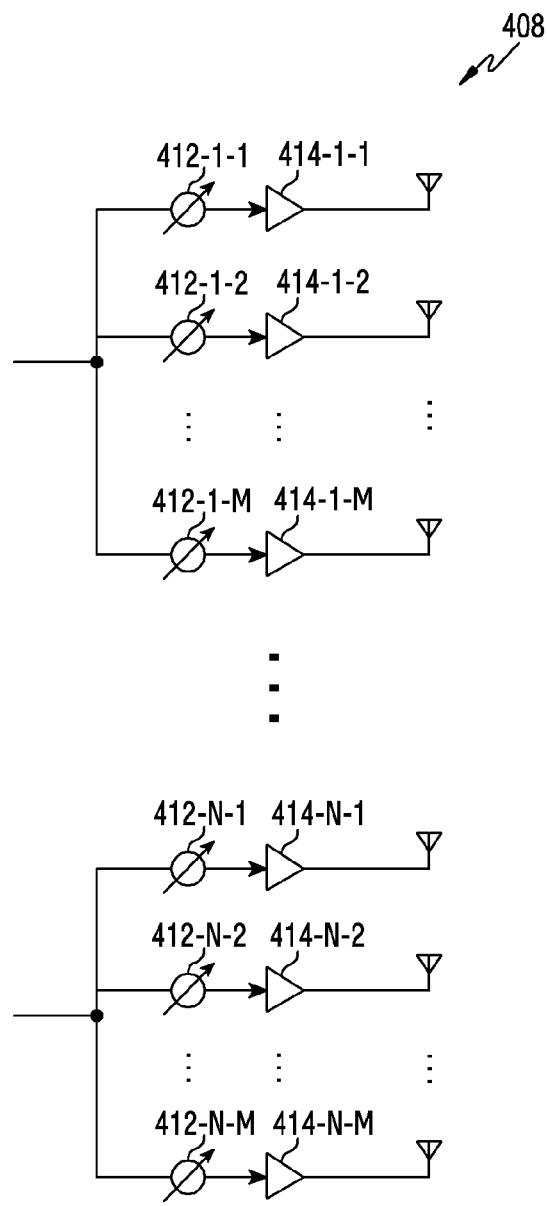
Figure 4C:
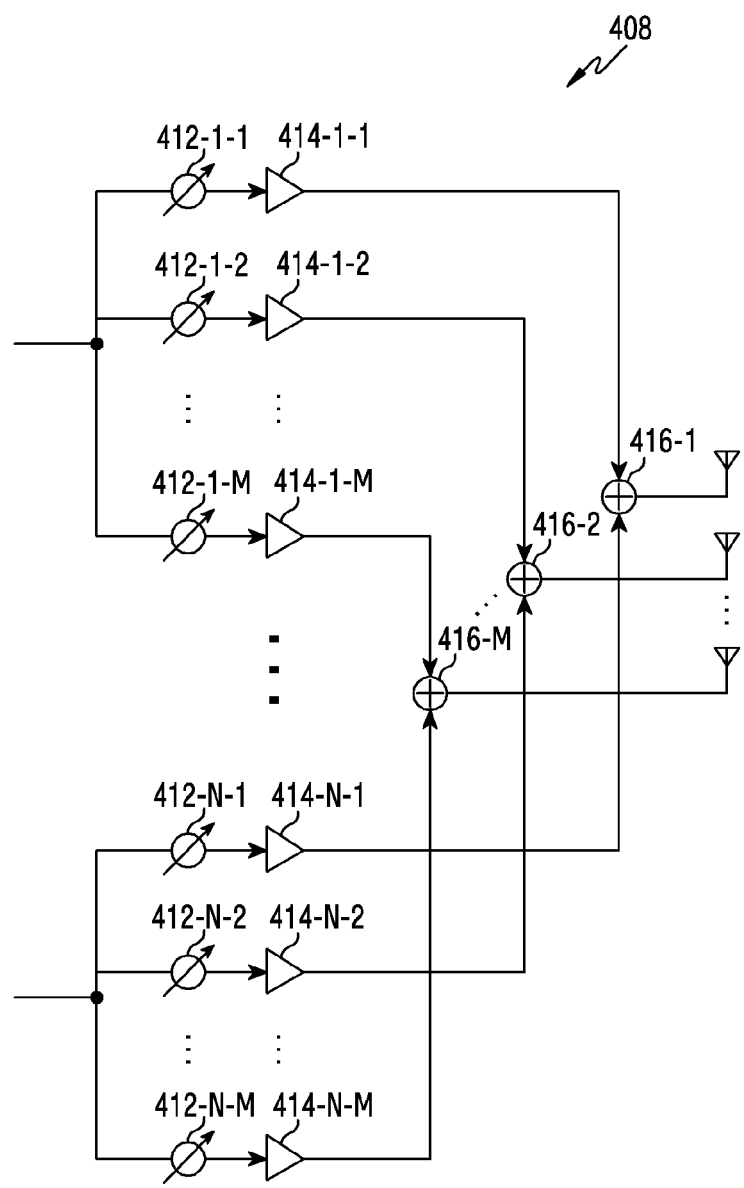

FIG. 4A to FIG. 4C illustrate a construction of a communication unit in a wireless communication system according to various embodiments of the present disclosure. FIG. 4A to FIG. 4C illustrate an example of a detailed construction of the wireless communication unit 210 of FIG. 2 or the wireless communication unit 310 of FIG. 3. In detail, FIG.

4A to FIG. 4C exemplify constituent elements for performing beamforming, as part of the wireless communication unit 210 of FIG. 2 or the communication unit 310 of FIG. 3.

Referring to FIG. 4A, the wireless communication unit 210 or the communication unit 310 includes an encoding and modulating unit 402, a digital beamforming unit 404, a plurality of transmission paths 406-1 to 406-N, and an analog beamforming unit 408.

The encoding and modulating unit 402 performs channel encoding. For the sake of the channel encoding, at least one of a low density parity check (LDPC) code, a convolution code, and a polar code may be used. By performing constellation mapping, the encoding and modulating unit 402 generates modulation symbols.

The digital beamforming unit 404 performs beamforming for a digital signal (e.g., modulation symbols). For this, the digital beamforming unit 404 multiplies the modulation symbols by beamforming weights. Here, the beamforming weights are used to alter a magnitude and phase of a signal, and may be denoted as a 'preceding matrix, a 'precoder', etc. The digital beamforming unit 404 outputs the digital beamformed modulation symbols to the plurality of transmission paths 406-1 to 406-N. At this time, in compliance with a multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert a digital beamformed digital signal into an analog signal. For this, each of the plurality of transmission paths 406-1 to 406-N may include an inverse fast Fourier transform (IFFT) operation unit, a cyclic prefix (CP) inserting unit, a DAC, and an up converting unit. The CP inserting unit is for an orthogonal frequency division multiplexing (OFDM) scheme and when another physical layer scheme (e.g., filter bank multi-carrier (FBMC) is applied, the CP inserting unit may be excluded. That is, the plurality of transmission paths 406-1 to 406-N provide an independent signal processing process for a plurality of streams generated through digital beamforming. However, in accordance with an implementation scheme, some of constituent elements of the plurality of transmission paths 406-1 to 406-N may be used for common use.

The analog beamforming unit 408 performs beamforming for an analog signal. For this, the digital beamforming unit 404 multiplies the analog signals by beamforming weights. Here, the beamforming weights are used to alter a magnitude and phase of a signal. In detail, in accordance with a coupling structure between the plurality of transmission paths 406-1 to 406-N and antennas, the analog beamforming unit 408 may be configured as in FIG. 4B or FIG. 4C.

Referring to FIG. 4B, signals inputted to the analog beamforming unit 408 go through operations of phase/magnitude conversion and/or amplification, and are transmitted through antennas. At this time, a signal of each path is transmitted through mutually different antenna sets, that is, antenna arrays. In a description of processing of a signal inputted through the first path, the signal is converted into a signal sequence having mutually different or identical phases/magnitudes by phase/magnitude converting units 412-1-1 to 412-1-M, and is amplified by amplifiers 414-1-1 to 414-1-M, and then is transmitted through the antennas.

Referring to FIG. 4C, signals inputted to the analog beamforming unit 408 go through operations of phase/magnitude conversion and/or amplification and then, are transmitted through the antennas. At this time, a signal of each path is transmitted through the same antenna set, that is, antenna array. In a description of processing of a signal inputted through the first path, the signal is converted into a signal sequence having mutually different or identical phases/magnitudes by phase/magnitude converting units 412-1-1 to 412-1-M, and is amplified by amplifiers 414-1-1 to 414-1-M. And, the amplified signals are summed up by summing unit 416-1 to 416-M with a criterion of an antenna element wherein the signals are transmitted through one antenna array, and then are transmitted through the antennas.

FIG. 4B illustrates an example in which an independent antenna array per transmission path is used, i.e., an example in which transmission paths of FIG. 4C share one antenna array. But, in accordance with another embodiment, some transmission paths may use an independent antenna array, and the remaining transmission paths may share one antenna array. Furthermore, in accordance with a further embodiment, a structure adaptively variable according to situation by applying a switchable structure between transmission paths and antenna arrays may be used. Below, a beam means a signal which is formed by analog beamforming, and a precoder means the processing of a signal which is controlled by digital beamforming. That is, the beamforming operation may include an analog beamforming operation for forming a beam (a transmission beam or a reception beam) of a base station or terminal, and a digital beamforming operation of determining a precoder used for data transmission.

Figure 5:
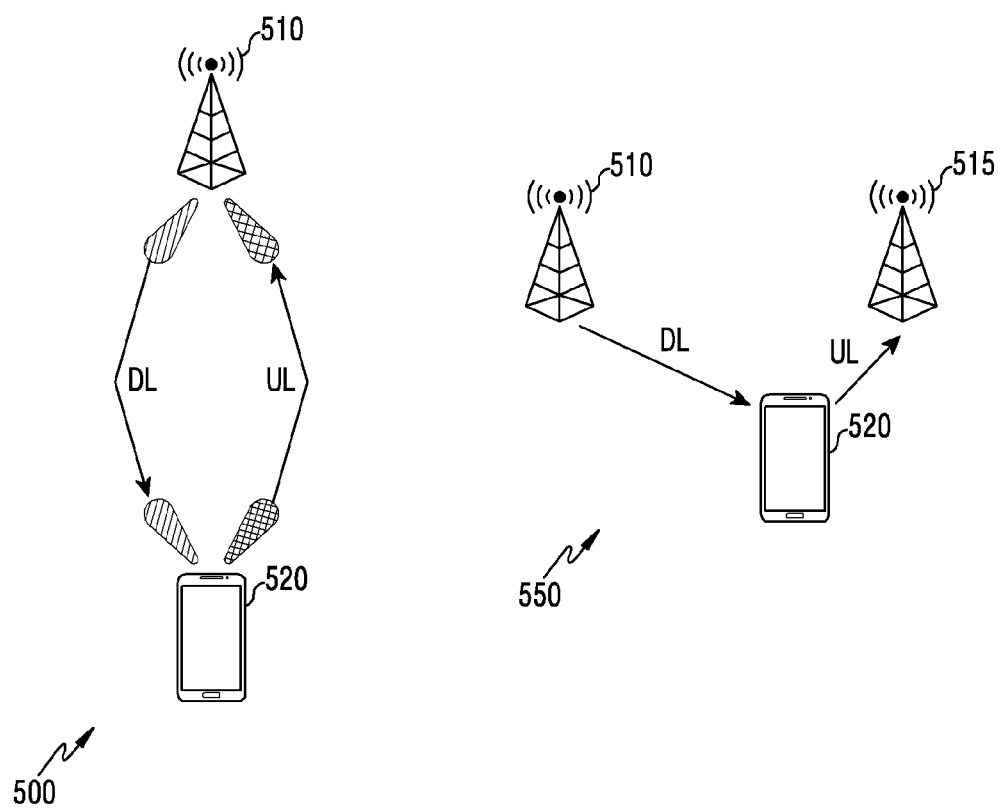
FIG. 5 illustrates a wireless environment according to various embodiments of the present disclosure.

FIG. 5 illustrates a wireless environment according to various embodiments of the present disclosure. A base station 510 may correspond to the base station 110 of FIG. 1. A terminal 520 may correspond to the terminal 120 of FIG. 1.

Referring to FIG. 5, a wireless network environment 500 may include the base station 510 and the terminal 520. The wireless network environment 500 includes downlink (DL) that is a link going from the base station 510 to the terminal 520, and uplink (UL) that is a link going from the terminal 520 to the base station 510.

The base station 510 and the terminal 520 may exchange a signal in order to determine a beam that will be used for downlink transmission or uplink transmission. The signal exchange procedure may be denoted as a beam training procedure, a beam search procedure, or a beam management procedure. The terminal 520 may measure each of received reference signals, to determine a channel quality of each of the reference signals. Below, in the present disclosure, a channel quality may be at least one of, for example, a beam reference signal received power (BRSRP), a reference signal received power (RSRP), a reference signal received quality (RSRQ), a received signal strength indicator (RSRI), a signal to interference and noise ratio (SINR), a carrier to interference and noise ratio (CINR), a signal to noise ratio (SNR), an error vector magnitude (EVM), a bit error rate (BER), and/or a block error rate (BLER). Undoubtedly, besides the aforementioned example, other terms having technological meanings equivalent to this or other metrics representing a channel quality may be used. Below, in the present disclosure, that a channel quality is high signifies that a signal magnitude related channel quality value is high or an error rate related channel quality value is small. This means that, as the channel quality is high, a smooth wireless communication environment is guaranteed. Also, the optimal beam may mean a beam of the highest channel quality among beams.

Uplink transmission may mean the transmission of uplink data. Downlink transmission may mean the transmission of downlink data. The base station 510 and the terminal 520 may each determine a downlink beam or uplink beam from the signal exchange procedure. For example, the base station 510 may determine a downlink transmission beam, and the terminal 520 may determine a downlink reception beam. For another example, the base station 510 may determine an uplink reception beam, and the terminal 520 may determine an uplink transmission beam.

Below, for description convenience's sake, the determined beam is denoted as a downlink transmission beam, a downlink reception beam, an uplink reception beam, and an uplink transmission beam, but the denoted term just signifies the determined beam itself, and does not limit its use. For example, the base station 510 may use a downlink transmission beam, for uplink reception. This means that a beam determined as the downlink transmission beam is used as a reception beam for receiving an uplink signal.

After each of the base station 510 and the terminal 520 determines a beam that will be used, each of the base station 510 and the terminal 520 may perform a procedure for determining a precoder (or a preceding matrix) that will be applied to data transmission. For example, in uplink transmission, the base station 510 may transmit a reference signal to the terminal 520. The terminal 520 may determine a precoder from the received reference signal. The reference signal transmitted by the base station 510 is for downlink transmission, but, when channel reciprocity is secured, may be used for determining a precoder for uplink transmission. In the following description, channel reciprocity means properties that an uplink channel and a downlink channel have a similar characteristic, in other words, the properties of a channel capable of treating an uplink channel response identically with a downlink channel response. When using the channel reciprocity, it is possible to obtain the downlink channel response by using the uplink channel response, or obtain the uplink channel response by using the downlink channel response. The terminal 520 may transmit uplink data to the base station 510 by applying the determined precoder. Undoubtedly, in response to the channel reciprocity being secured, a precoder that will be applied to downlink transmission (downlink data transmission) by the base station 510 may be determined from an uplink reference signal transmitted by the terminal 520.

On the other hand, a downlink transmission beam and uplink reception beam of the base station 510 may be different from each other. In response to a downlink beam and uplink beam of the base station 510 being different from each other, the base station 510 may be expressed as not satisfying beam correspondence or beam reciprocity. Here, the beam correspondence means properties that an uplink beam and a downlink beam have a similar characteristic, in other words, the properties of a beam capable of treating an uplink beam direction identically with a downlink beam direction. When using the beam correspondence, it is possible to use, in downlink, a beam used in uplink, or use, in uplink, a beam used in downlink. Similarly with the base station 510, a downlink reception beam and uplink transmission beam of the terminal 520 may be different from each other. That is, the terminal 520 may fail to satisfy the beam reciprocity.

In response to beams used in downlink and uplink not being the same a downlink transmission beam and uplink reception beam of the base station 510 are different, and a downlink reception beam and uplink transmission beam of the terminal 520 are different), the channel reciprocity is difficult to be guaranteed. This is because a state of a wireless channel a signal suffers becomes different due to a directive characteristic of the beam.

Besides when an uplink beam and a downlink beam are different in one base station, even when a base station coupled for uplink with one terminal and a base station coupled for downlink are different as in a wireless network environment 550, the channel reciprocity may not be satisfied. The wireless network environment 550 may include the base station 510, a base station 515, and the terminal 520. The base station 510 may be a base station coupled for downlink transmission to the terminal 520, and the base station 515 may be a base station for uplink transmission of the terminal 520. For example, the terminal 520 is located close to the base station 515 and thus is coupled with the base station 515 for the sake of uplink transmission, but is coupled with the base station 510 for the sake of downlink transmission, in that a transmission power for downlink transmission of the base station 510 is high.

Unlike illustrated in FIG. 5, the base station 510 or the terminal 520 may satisfy beam correspondence as well. In this case, the base station 510 may determine a downlink precoder from an uplink reference signal (e.g., a sounding reference signal (SRS)) by using channel reciprocity, and the terminal 520 may determine an uplink precoder from a downlink reference signal (e.g., a CSI-RS) by using the channel reciprocity.

As described above, it is required to consider a relationship between an uplink beam and a downlink beam which are used in a base station or a terminal at the time of determining a precoder by using channel reciprocity. Also, the terminal may recognize that a downlink reception beam and uplink transmission beam of the terminal obtained through a beam management procedure are different, but may not determine whether the base station (e.g., the base station 510 of the wireless network environment 500) satisfies beam correspondence, and may not determine even whether the base stations coupled for downlink/uplink transmission with the terminal is the same or different (e.g., the base station 510 and the base station 515 of the wireless network environment 500). In response to the terminal determining an uplink precoder from the received downlink reference signal, a problem of failing to exactly reflect a state of a channel may occur as well.

Below, to solve the aforementioned problems, a precoder determining and uplink/downlink transmission procedure considering an uplink beam and a downlink beam is described. Particularly, indication information for notifying a channel state to a terminal wherein the terminal accurately reflects the channel state is required. Below, for description convenience's sake, the precoder determining operation may be denoted as 'reciprocity-based preceding', and the uplink/downlink transmission may be denoted as 'reciprocity-based uplink/downlink transmission'. FIG. 6 to FIG. 21 depict an uplink transmission method according to various embodiments of the present disclosure, and FIG. 22 to FIG. 28 depict a downlink transmission method according to various embodiments of the present disclosure. On the other hand, the present disclosure r ay assume an environment (e.g., a TDD system) in which channel reciprocity is satisfied when beam correspondence is satisfied.

Reciprocity-Based Uplink Transmission

Figure 6:
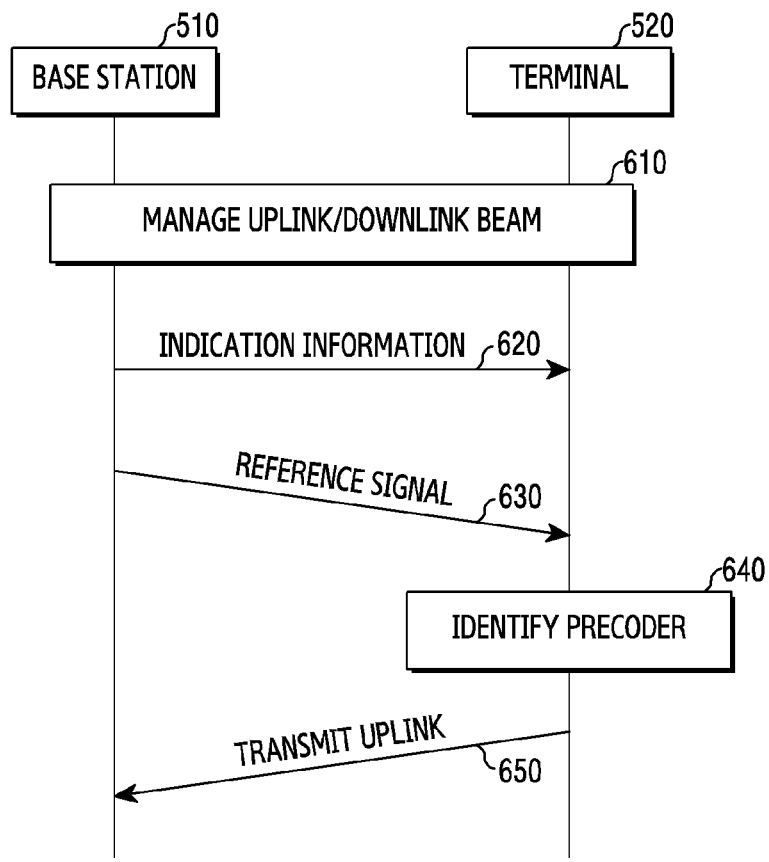
FIG. 6 illustrates an uplink transmission procedure according to various embodiments of the present disclosure.

FIG. 6 illustrates an uplink transmission procedure according to various embodiments of the present disclosure.

Referring to FIG. 6, in step 610, the base station 510 and the terminal 520 may determine a beam that will be used in uplink and/or downlink. Step 610 may be denoted as a beam management procedure, a beam search procedure, or a beam training procedure. For example, the base station 510 may transmit a reference signal to the terminal 520 through each of a plurality of beams, and receive feedback information from the terminal 520, thereby determining a downlink transmission beam. The terminal 520 may receive the reference signal from the base station 510 through each of the plurality of beams, thereby determining a downlink reception beam. Here, the operation of transmitting/receiving the reference signal through each of the plurality of beams may be denoted as a beam sweep operation. Similarly, the terminal 520 may transmit a reference signal to the base station 510 through the beam sweep operation, and receive feedback information from the base station 510, thereby determining an uplink transmission beam. The base station 510 may receive the reference signal from the terminal 520 through the beam sweep operation, thereby determining an uplink reception beam. Below, FIG. 7 to FIG. 21 presume a situation of determining a reception beam that will be used in uplink by the base station 510 and a transmission beam that will be used in downlink, and a transmission beam that will be used in uplink by the terminal 520 and a reception beam that will be used in downlink. In other words, a situation of previously determining the beams that will be used for uplink transmission or downlink transmission in each of the base station 510 and the terminal 520 is described.

In step 620, the base station 510 may transmit indication information for reciprocity-based precoding, to the terminal 520. The indication information may indicate an operation required for uplink transmission. The required operation may include a beamforming operation of setting a reception beam for receiving a reference signal, a transmission beamforming operation for data transmission, an operation of measuring a reference signal, an operation of transmitting an uplink reference signal, an operation of setting a codebook, or a digital beamforming operation of calculating a precoder.

In some embodiments, the indication information may include information representing a use of a reference signal which is transmitted to determine a precoder. The precoder may be a precoder (below, an uplink precoder) which will be applied to uplink transmission going from the terminal 520 to the base station 510. The reference signal may be a downlink reference signal transmitted from the base station 510 in step 630 described later. The indication information may represent whether the downlink reference signal is a use used for downlink transmission, is a use used for uplink transmission, or is a use used for all of downlink transmission and uplink transmission. Here, being the use used for all of the downlink transmission and the uplink transmission may mean that channel reciprocity is satisfied. In accordance with the use of the downlink reference signal, not only a beam of the base station 510 transmitting the reference signal, but also a beam of the terminal 520 for receiving the reference signal may become different.

In other some embodiments, the indication information may include information representing a beam that will be used for uplink transmission. The beam may be the beam determined in step 610. The terminal 520 may determine, from the indication information, the uplink transmission beam or downlink reception beam determined in step 610, as the beam that will be used for uplink transmission.

In further other some embodiments, the indication information may include information representing a precoding scheme. Here, the precoding scheme may mean a scheme of determining an uplink precoder. The precoding scheme may include a scheme (a downlink measurement based scheme) of calculating a precoder by using a reference signal received from the base station 510 or a scheme (an uplink measurement based scheme) of obtaining a precoder from a precoding matrix indicator (PMI) received from the base station 510. The precoding scheme may be determined according to the satisfaction or non-satisfaction of channel reciprocity between the base station 510 and the terminal 520.

In yet other some embodiments, the indication information may include information representing a function of a PMI. Here, the PMI function may mean a role of a PMI when the base station 510 feeds back the PMI to the terminal 520. The PMI function may include a function representing a precoder that will be applied to uplink transmission or a function for reflecting the influence of uplink interference when calculating the precoder on the basis of a downlink reference signal.

In still other some embodiments, the indication information may include information representing an uplink transmission scheme. The uplink transmission scheme may include a codebook based UL transmission scheme, a non-codebook based UL transmission scheme (uplink transmission not being based on a codebook), or a diversity based UL transmission scheme. Here, the codebook-based uplink transmission scheme means a scheme of applying a precoder of a fed-back PMI to perform uplink transmission, and the non-codebook based UL transmission scheme means a scheme of autonomously (without being limited to codebook use or non-use) selecting and applying a precoder at a transmission end, to perform uplink transmission. In other words, the non-codebook based uplink transmission scheme has a higher degree of freedom than the codebook-based uplink transmission scheme in an operation scheme.

On the other hand, in some embodiments, part of information included in the indication information of the aforementioned embodiments may be included in the indication information, together. For example, the indication information may include, at one time, information representing a beam that will be used for uplink transmission and information representing an uplink transmission scheme. Also, in other some embodiments, one information (or field) may simultaneously indicate some of the aforementioned embodiments as well. For example, at least one specific bit may represent a use of a reference signal and represent a use of an uplink PMI as well.

Also, in step 620 of FIG. 6, it is illustrated that the indication information is once transmitted, but an embodiment is not limited to this. Each of the indication information including other information may be transmitted at different timing as well. For example, the base station 510 may transmit the information representing the PMI function, after transmitting the information representing the use of the reference signal.

The indication information may be transmitted from the base station 510 to the terminal 520 through various schemes. In some embodiments, the indication information may be transmitted through downlink control information (DCI). In other some embodiments, the indication information may be transmitted through a medium access control (MAC) control element (CE). In further other some embodiments, the indication information may be transmitted through higher layer signaling as well.

In step 630, the base station 510 may transmit a reference signal to the terminal 520. Each of the base station 510 and the terminal 520 may perform step 630 through the beam determined in step 610. In some embodiments, the base station 510 may transmit the reference signal through the downlink transmission beam determined in step 610. The terminal 520 may receive the reference signal through the downlink reception beam determined in step 610. The reference signal may be used to measure a downlink channel formed through the downlink beam. In other some embodiments, the base station 510 may transmit the reference signal, by using, as a transmission beam, the uplink reception beam determined in step 610. The terminal 520 may receive the reference signal, by using, as a reception beam, the uplink transmission beam determined in step 610. The reference signal may be used to measure an uplink channel formed through the uplink beam.

Below, in the present disclosure, the reference signal may be a reference signal for estimating a channel. For example, the reference signal may be a channel state information—reference signal (CSI-RS). For another example, the reference signal may be a cell-specific reference signal (CRS). For further example, the reference signal may be a demodulation-RS (DM-RS). To support non-codebook based preceding in uplink, the DM-RS may be defined as a separate uplink reference signal. Also, for further another example, the reference signal may be a beam reference signal (BRS). Also, for yet another example, the reference signal may be a beam refinement reference signal (BRRS).

Below, in the present disclosure, a signal transmitted or received using a beam is described taking a reference signal as an example, but not only the reference signal but also a synchronization signal may be used as well. For example, the synchronization signal may include at least one of a primary synchronization signal (PSS), a secondary synchronization signal (SSS), an extended synchronization signal (ESS), and an SS block.

In FIG. 6, it is illustrated that the transmission of the indication information of step 620 is performed earlier than the transmission of the reference signal of step 630, but an embodiment is not limited to this. In accordance with information included in the indication information, a timing of transmission of the indication information may be determined. For example, in response to the indication information including information about the reference signal transmitted in step 630, step 620 may, as illustrated in FIG. 6, be first performed. But, in response to the indication information including information about a beam that will be used for uplink transmission, step 630 may, unlike illustrated in FIG. 6, be first performed as well.

In step 640, the terminal 520 may determine a precoder that will be used for uplink transmission. The terminal 520 may determine the precoder on the basis of a codebook-based precoding scheme of determining a precoder according to a codebook which includes a PMI received from the base station 510 and precoder information, or identify the precoder on the basis of a non-codebook based precoding scheme of calculating the precoder according to a PMI or a reference signal.

The terminal 520 may determine the precoder on the basis of the information included in the indication information. In some embodiments, the terminal 520 may calculate the precoder on the basis of the reference signal received from the base station 510. The terminal 520 may measure the received reference signal according to indicated by the indication information, and calculate the precoder on the basis of the measured result. This is because the base station 510 may determine the satisfaction or non-satisfaction of channel reciprocity and, accordingly to this, generates the indication information. The reference signal is transmitted through downlink, but may be used for uplink precoder determination.

In other some embodiments, although not illustrated in FIG. 6, the terminal 520 may determine a precoder according to a PMI received from the base station 510. The base station 510 may determine whether to determine the precoder indicated by the PMI, according to indicated by the indication information. For example, the terminal 520 may identify a precoder corresponding to an index indicated by a PMI, in a codebook included in the terminal 520. For another example, the terminal 520 may calculate a precoder from the PMI representing the interference of uplink transmission and the reference signal as well.

In step 650, the terminal 520 may perform uplink transmission. The terminal 520 may transmit uplink data to the base station 510. By applying the precoder determined (or calculated) in step 640 to data symbols intended to be transmitted, the terminal 520 may transmit the uplink data to the base station 510.

According to various embodiments of the present disclosure, a device of a terminal may include at least one processor, and at least one transceiver for receiving, from a base station, indication information which is determined according to whether channel reciprocity with the base station is satisfied and which is for controlling a beamforming operation of the terminal, and receiving a reference signal from the base station, and transmitting uplink data to the base station on the basis of the indication information and the reference signal.

FIG. 6 illustrates a schematic flow of the uplink transmission procedure through the reciprocity-based precoding of various embodiments of the present disclosure. Below, FIG. 7 to FIG. 21 depict a detailed procedure for the reciprocity-based precoding in a beamforming communication system.

Reference Signal for Uplink Precoding

Below, in FIG. 7 to FIG. 9, the transmission of a reference signal for uplink precoding is supported. Here, the reference signal may be a CSI-RS. A general reference signal used for downlink transmission is supported as it is. Besides this, in response to an uplink beam or a downlink beam being different (e.g., the wireless network environment 500) or in response to a base station coupled through uplink with a terminal and a base station coupled through downlink being different (that is, in response to channel reciprocity not being satisfied), additionally, the transmission of the reference signal for uplink precoding may be supported. Here, in response to the reference signal for uplink precoding being transmitted, for the sake of satisfaction of channel reciprocity, the corresponding reference signal may be transmitted by the base station by using an uplink reception beam, and may be received by the terminal by using an uplink transmission beam. The uplink reception beam and the uplink transmission beam may be beams determined by the beam search procedure (e.g., step 610 of FIG. 6) between the terminal and the base station.

Figure 7:
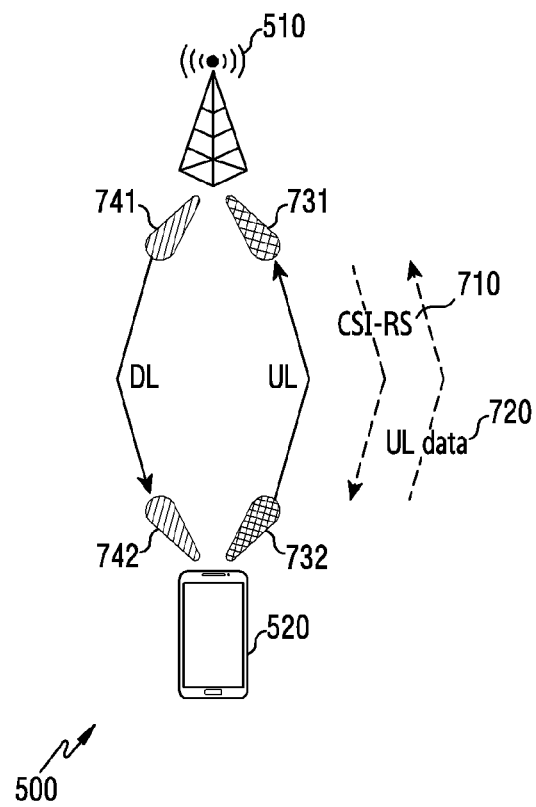
FIG. 7 illustrates an example of determining a beam of a reference signal for uplink transmission according to various embodiments of the present disclosure.
Figure 8:
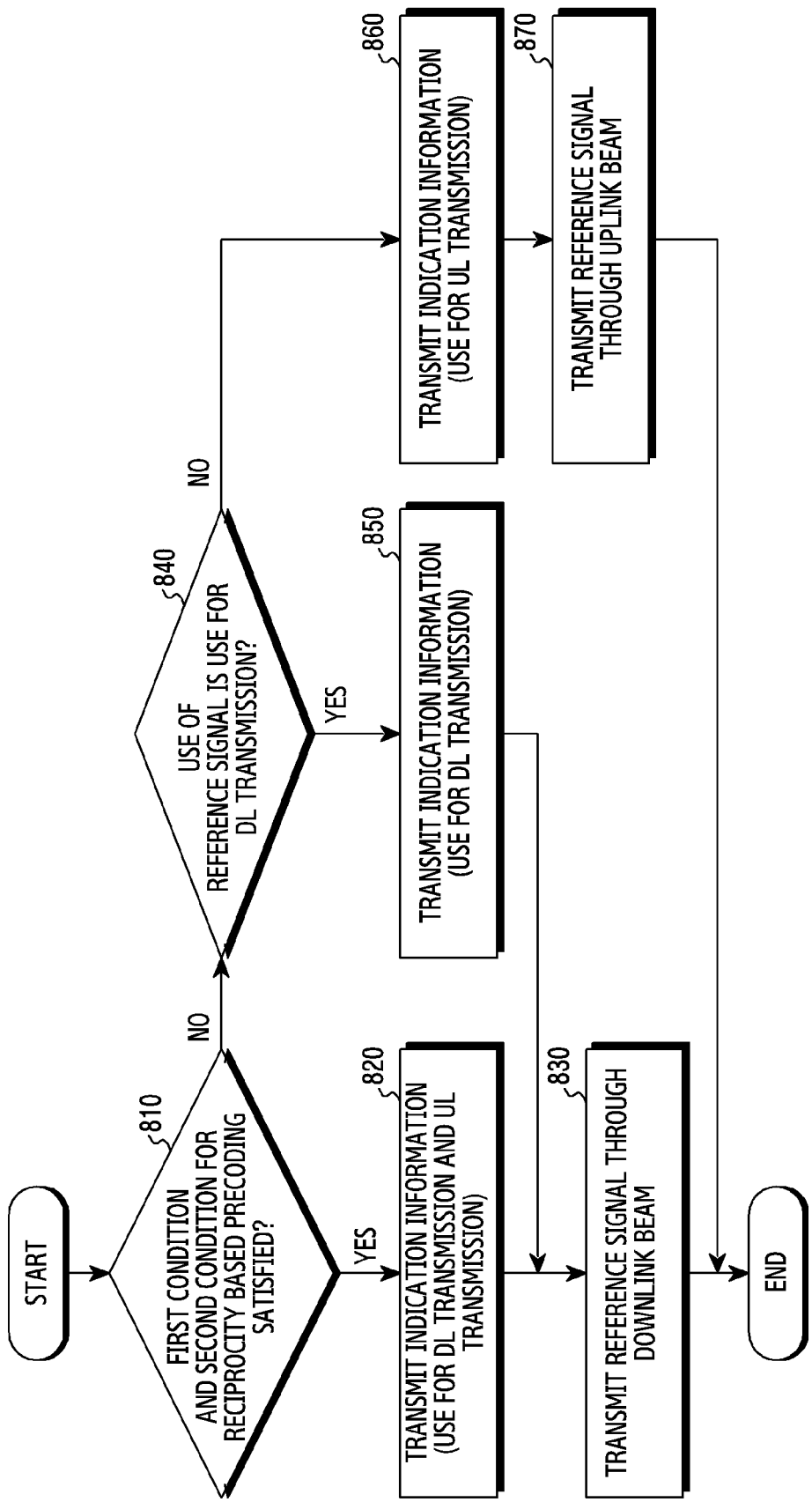
FIG. 8 illustrates an operation flow of a base station for determining a beam of a reference signal for uplink transmission according to various embodiments of the present disclosure.

FIG. 7 illustrates an example of determining a beam of a reference signal for uplink transmission according to various embodiments of the present disclosure. FIG. 7 illustrates that an uplink reception beam 731, an uplink transmission beam 732, a downlink transmission beam 741, and a downlink reception beam 742 are each distinguished, but an embodiments not limited to this. That is, unlike illustrated in FIG. 7, beam correspondence is satisfied and thus, an uplink reception beam of the base station 510 may correspond to a downlink transmission beam, and a downlink reception beam of the terminal 520 may correspond to an uplink transmission beam as well. Undoubtedly, the above example is applied to not only FIG. 7 but also conceptual diagrams (FIG. 10, FIG. 13, FIG. 16, FIG. 19, FIG. 23, and FIG. 26) of embodiments described later.

Referring to FIG. 7, the base station 510 may transmit a reference signal (e.g., a CSI-RS) to the terminal 520 through an uplink beam (710). In detail, the base station 510 may use the uplink reception beam 731 as a beam that will be used to transmit the reference signal. This operation means that the base station 510 uses, as a transmission beam, a beam indicated by the same index as an index corresponding to the uplink reception beam 731. Here, it is assumed that the uplink reception beam 731 and the uplink transmission beam 732 are previously determined by the base station 510 and the terminal 520 through a beam management procedure.

Although not illustrated in FIG. 7, undoubtedly, a reference signal for downlink transmission may be transmitted through a downlink beam (e.g., the beam 741 or the beam 742). Also, when the reference signal is utilizable for all uplink and downlink as when channel reciprocity is satisfied, the reference signal may be transmitted through any one of the downlink beam or the uplink beam.

The base station 510 may determine through which beam to transmit the reference signal. On the other hand, the terminal 520 may receive separate indication information, so as to determine whether the reference signal to be received is transmitted using the uplink reception beam 731 or is transmitted through the downlink transmission beam 741. This is because a beam that will be used for uplink transmission becomes different depending on through which beam the reference signal is transmitted. The base station 510 may transmit the indication information to the terminal 520. In detail, the base station 510 may determine a beam that will transmit the reference signal for uplink transmission, according to a procedure illustrated in FIG. 8. FIG. 8 illustrates an operation flow of the base station 510 for determining a beam of a reference signal for uplink transmission according to various embodiments of the present disclosure.

In step 810, the base station 510 may determine whether an uplink beam (e.g., the beam 731 and the beam 732) and a downlink beam (e.g., the beam 741 and the beam 742) are the same as each other and whether a base station coupled through uplink with the terminal 520 and a base station coupled through downlink are the same as each other. Below, for description convenience's sake, whether the uplink beam and the downlink beam are the same as each other is denoted as a first condition for reciprocity-based precoding, and whether the base station coupled through uplink and the base station coupled through downlink are the same as each other is denoted as a second condition for reciprocity-based precoding.

The base station 510 may determine whether the first condition is satisfied. The base station 510 may determine whether the uplink reception beam and downlink transmission beam of the base station 510 are the same as each other, and the uplink transmission beam and downlink reception beam of the terminal 520 are the same as each other. In response to the base station 510 and the terminal 520 all satisfying beam correspondence, the base station 510 may determine that the first condition is satisfied.

The base station 510 may determine whether the second condition is satisfied. The base station 510 may determine whether a base station coupled for downlink with the terminal 520 and a base station coupled for uplink with the terminal 520 are the same. For example, the base station 510 may determine whether uplink and downlink are all coupled with the terminal 520. When the base station 510 and the terminal 520 are in an RRC connection state for the sake of downlink transmission, but a base station coupled for uplink transmission of the terminal 520 is the base station 515, not the base station 510, the base station 510 may determine that the second condition is not satisfied.

In response to satisfying all of the first condition and the second condition, the base station 510 may perform step 820. But, in response to even one of the first condition or the second condition not being satisfied, the base station 510 may perform step 840. In the present disclosure, for description convenience's sake, the first condition and the second condition are described, but the satisfaction or non-satisfaction of the first condition and the second condition means the satisfaction or non-satisfaction of channel reciprocity. That is, in response to the base station 510 determining that the channel reciprocity is satisfied, the base station 510 may perform step 820 and otherwise, the base station 510 may perform step 840.

In step 820, the base station 510 may transmit indication information to the terminal 520. The indication information may represent that a measurement result of a transmitted reference signal is utilizable for all of uplink transmission and downlink transmission. This is because all of the first condition and the second condition are satisfied and thus channel reciprocity (and beam correspondence) may be utilized.

In step 830, the base station 510 may transmit a reference signal to the terminal 520 through a downlink transmission beam. In response to step 830 being performed after step 820, the beam correspondence is satisfied and thus, an index of the downlink transmission beam and an index of an uplink reception beam may be the same as each other.

In step 840, the base station 510 may determine whether a reference signal is a use for downlink transmission. In response to the downlink transmission being needed, the base station 510 may determine the reference signal as the use for downlink transmission, and perform step 850. To the contrary, in response to uplink transmission being required, the base station 510 may determine the reference signal as a use for uplink transmission, and perform step 860.

In step 850, the base station 510 may transmit indication information to the terminal 520. The indication information may represent the use for downlink transmission.

In step 860, the base station 510 may transmit indication information to the terminal 520. The indication information may represent the use for uplink transmission.

In step 870, the base station 510 may transmit the reference signal to the terminal 520 by using the uplink reception beam 731. The base station 510 may transmit the reference signal to the terminal 520, by using, as a transmission beam, a beam having the same index as the uplink reception beam 731.

As described above, in step 820, step 850 and step 860, the base station 510 may transmit the indication information to the terminal 520. Here, the indication information may be configured in various schemes. In accordance with a construction of the indication information, the terminal 520 may obtain the use of the reference signal in various schemes. In detail, the terminal 520 may obtain through which beam the reference signal is transmitted, on the basis of signaling (embodiment 1) of the base station 510 or a predefined pattern (embodiment 2).

Embodiment 1: Indication Information on Uplink/Downlink Utilization or Non-Utilization of Downlink Reference Signal The base station 510 may transmit, to the terminal 520, indication information representing a use of a reference signal (e.g., CSI-RS). The use may be one of the following three uses.

Use 1: use for all of uplink and downlink transmission
Use 2: use for downlink transmission (below, DL CSI measurement)
Use 3: use for uplink transmission (below, UL CSI measurement)

In other words, the indication information may be indication information representing whether the reference signal is utilizable for uplink or is utilizable for downlink.

In some embodiments, to represent one of the three uses, the indication information may include at least 2-bit. For example, in response to the indication information including 2-bit for indicating one of the three uses, the use 1 may be indicated by '00', the use 2 may be indicated by '01', and the use 3 may be indicated by '10'. The '00' may be reserved information.

In other some embodiments, the indication information may include information for distinguishing the use 3 and the remaining uses (the use 1 and the use 2). For example, the indication information may be 1 bit. The use 3 may be indicated by '1', and other uses may be indicated by '0'.

Because the terminal 520 has to determine a beam (that is, a reception beam) that will be set at reference signal reception according to use, the indication information is required to be transmitted before reference signal transmission. In other words, in the corresponding embodiment, it may be required that step 620 of FIG. 6 be performed earlier than step 630.

Also, a scheme of transmitting the indication information may be one of a dynamic transmission scheme and a semi-static transmission scheme. The dynamic transmission scheme may change a use of a reference signal freely according to need and thus, may adaptively utilize the reference signal. In some embodiments, the indication information may be transmitted through DCI. For example, a new DCI format including a field representing a use of a reference signal, that is, through which beam among a downlink transmission beam and an uplink reception beam the reference signal is transmitted may be defined. For another example, a specific use among the three uses may be represented through a combination of two fields of the DCI format. For further example, the use of the reference signal may be indicated through a reserved bit included in the specific field of the DCI format as well. In other some embodiments, the indication information may be transmitted through a MAC CE. The indication information may be used for MAC layer control signaling between the base station 510 and the terminal 520. The base station 510 may set a logical channel identifier (LCID) representing a use of a reference signal, to configure the MAC CE, and transmit this to the terminal 520.

The semi-static transmission scheme may reduce the consumption of a resource for repeatedly transmitting the indication information, by omitting a separate procedure for notifying a use of a reference signal. In some embodiments, the indication information may be transmitted through higher layer signaling. The base station 510 may transmit the indication information to the terminal 520, through a radio resource signaling (RRC) message. The RRC message may include an information element (IE) representing the use of the reference signal (or whether an uplink beam is used for transmission of a downlink reference signal).

Embodiment 2: Pattern Related with Uplink Transmission

In response to the non-codebook based uplink transmission being set by the base station 510, the next first reference signal (e.g., CSI-RS) may be set to be utilizable for a use for uplink transmission (LI CSI measurement), and a next reference signal may be set to be utilizable for a use for downlink transmission (DL CSI measurement).

Additionally, the base station 510 may notify the terminal 520 whether the first reference signal is utilizable even for the use for downlink transmission through 1-bit indication information, and notify the terminal 520 whether the next reference signal is utilizable even for the use for uplink transmission through the 1-bit indication information in a similar manner. Through the embodiment 2, the number of bits consumed by separate indication information may be reduced.

In another alternative embodiment, the base station 510 may transmit resource information representing a predefined pattern to the terminal 520 through separate signaling (e.g., DCI). Here, the resource information representing the predefined pattern may be information representing a pattern of a resource for identifying a reference signal utilizable for a use for uplink transmission among transmitted reference signals.

In response to receiving the indication information, the terminal 520 may obtain through which beam a reference signal to be received will be transmitted. The terminal 520 may determine a beam that will receive the reference signal, as a beam corresponding to a beam used for transmission of the reference signal. For example, in response to the reference signal being transmitted through the uplink reception beam 731, the terminal 520 may use the uplink transmission beam 732 as a reception beam for receiving the reference signal.

The terminal 520 may determine a precoder that will be applied to uplink transmission on the basis of the received reference signal. In detail, in accordance with a procedure illustrated in FIG. 9, the terminal 520 may determine a beam of a reference signal for uplink transmission, and determine a transmission beam for uplink transmission. FIG. 9 illustrates an operation flow of the terminal 520 for determining a beam of a reference signal for uplink transmission according to various embodiments of the present disclosure.

In step 910, the terminal 520 may receive indication information.

In step 920, the terminal 520 may determine whether a use of a reference signal represented by the received indication information is a use for uplink transmission. Here, the use may be the use 3 corresponding to the UL CSI measurement. In response to the use being the use for uplink transmission, the terminal 520 may perform step 930. In response to the use not being the use for uplink transmission, the terminal 520 may perform step 950. For example, in response to the use being for downlink transmission or being utilizable for all of uplink/downlink transmission, the terminal 520 may perform step 950.

In step 930, the terminal 520 may receive a reference signal through an uplink beam. Here, the uplink beam means the uplink transmission beam 732. In other words, the terminal 520 may receive the reference signal by using the uplink transmission beam 732.

In step 940, the terminal 520 may calculate a precoder that will be used for uplink transmission, based on the received reference signal. In response to the terminal 520 performing step 940 after performing step 930, because the received reference signal has been transmitted through an uplink channel, the calculation of precoding for uplink transmission is available. In response to the terminal 520 performing step 940 after performing step 960, the received reference signal is transmitted through a downlink channel. At this time, because the use of the reference signal is utilizable for all of uplink transmission and downlink transmission, that is, because channel reciprocity is guaranteed, the terminal 520 may use the received reference signal, for the calculation of precoding for uplink transmission.

Figure 9:
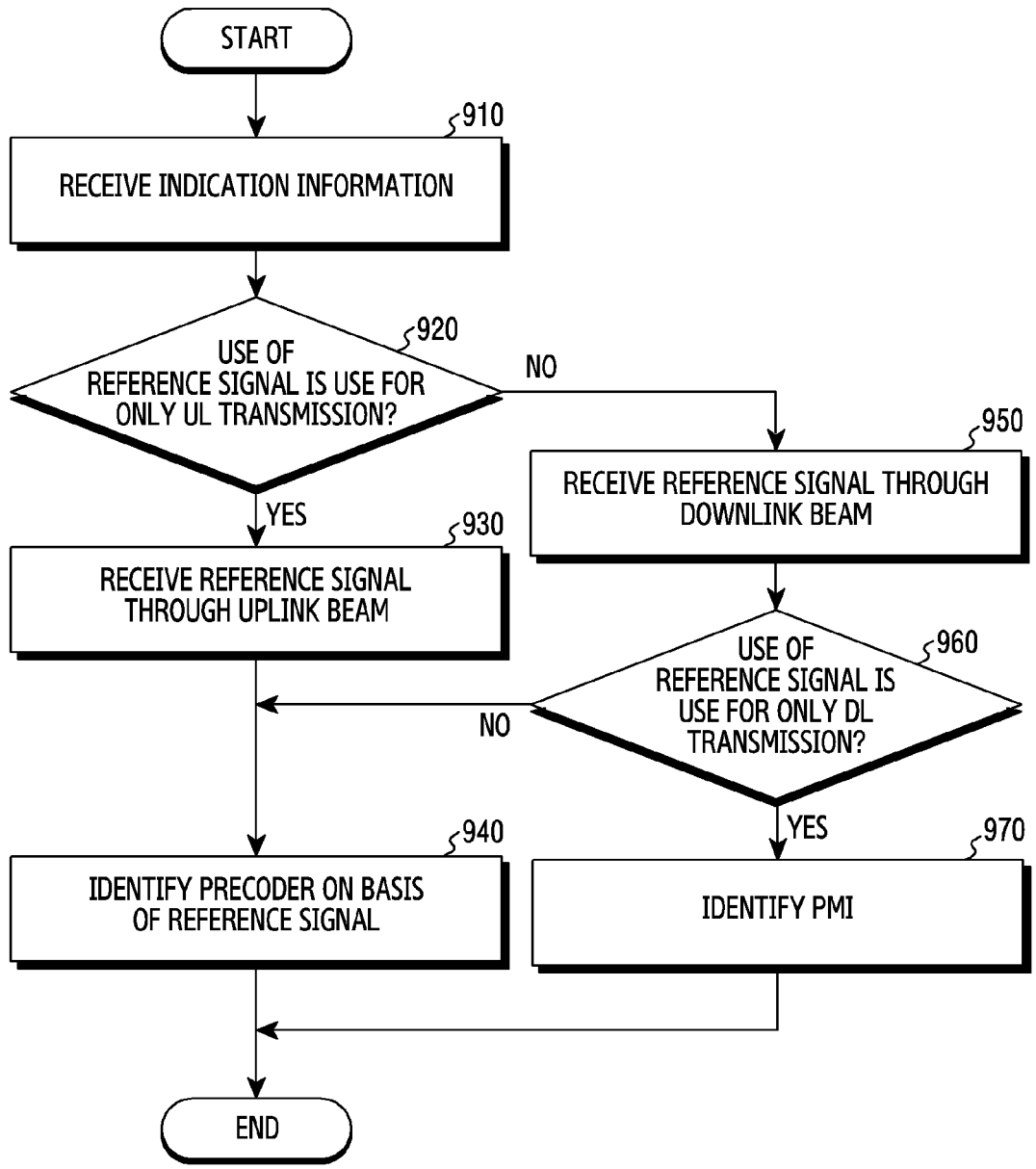
FIG. 9 illustrates an operation flow of a terminal for determining a beam of a reference signal for uplink transmission according to various embodiments of the present disclosure.

Although not illustrated in FIG. 9, the terminal 520 may transmit uplink data to the base station 510 by applying the precoding calculated in step 940 (720).

In step 950, the terminal 520 may receive a reference signal through a downlink beam. Here, the downlink beam means the downlink reception beam 742. In other words, the terminal 520 may receive the reference signal by using the downlink reception beam 742.

In step 960, the terminal 520 may determine whether the use of the reference signal represented by the received indication information is a use for only downlink transmission. Here, the use may be the use 2 corresponding to the UL CSI measurement. In response to the use being the use for only downlink transmission, the terminal 520 may perform step 970. In response to the use not being the use for only downlink transmission, the terminal 520 may perform step 940.

In step 970, the terminal 520 may determine information, i.e., a PMI indicating a precoder for downlink transmission, on the basis of the received reference signal. In response to the use of the reference signal being used for only the DL CSI measurement, the terminal 520 may determine the PMI, according to the result of the DL CSI measurement. Here, the PMI indicates a precoding matrix for downlink transmission. Although not illustrated in FIG. 9, the terminal 520 may feed back the PMI to the base station 510.

The terminal 520 may determine a precoder for uplink transmission, and apply the determined precoder, to transmit uplink data to the base station 510 (720). Because the reference signal used for determining of the precoder has been transmitted through an uplink beam, even the uplink data may be transmitted through the uplink beam, for the sake of utilization of the measurement result of the uplink channel for the uplink beam. The terminal 520 may transmit the uplink data to the base station 510 through the uplink transmission beam 732. The base station 510 may receive the uplink data from the terminal 520 through the uplink reception beam 731.

Downlink Beam Based Uplink Transmission

Figure 10:
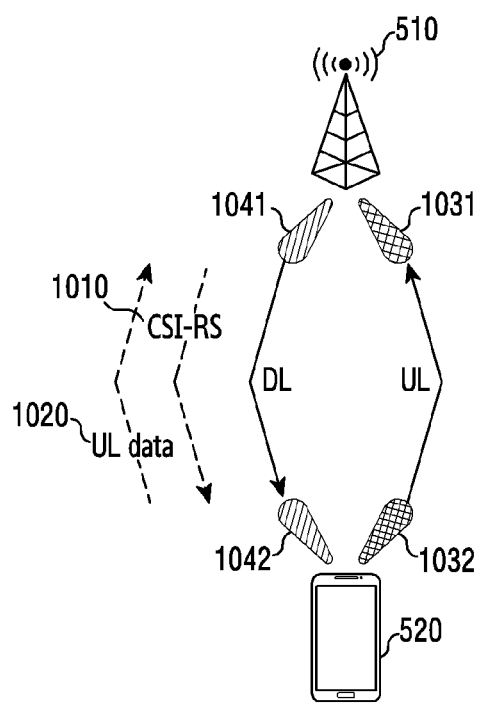
FIG. 10 illustrates an example of determining a beam for uplink transmission according to various embodiments of the present disclosure.
Figure 11:
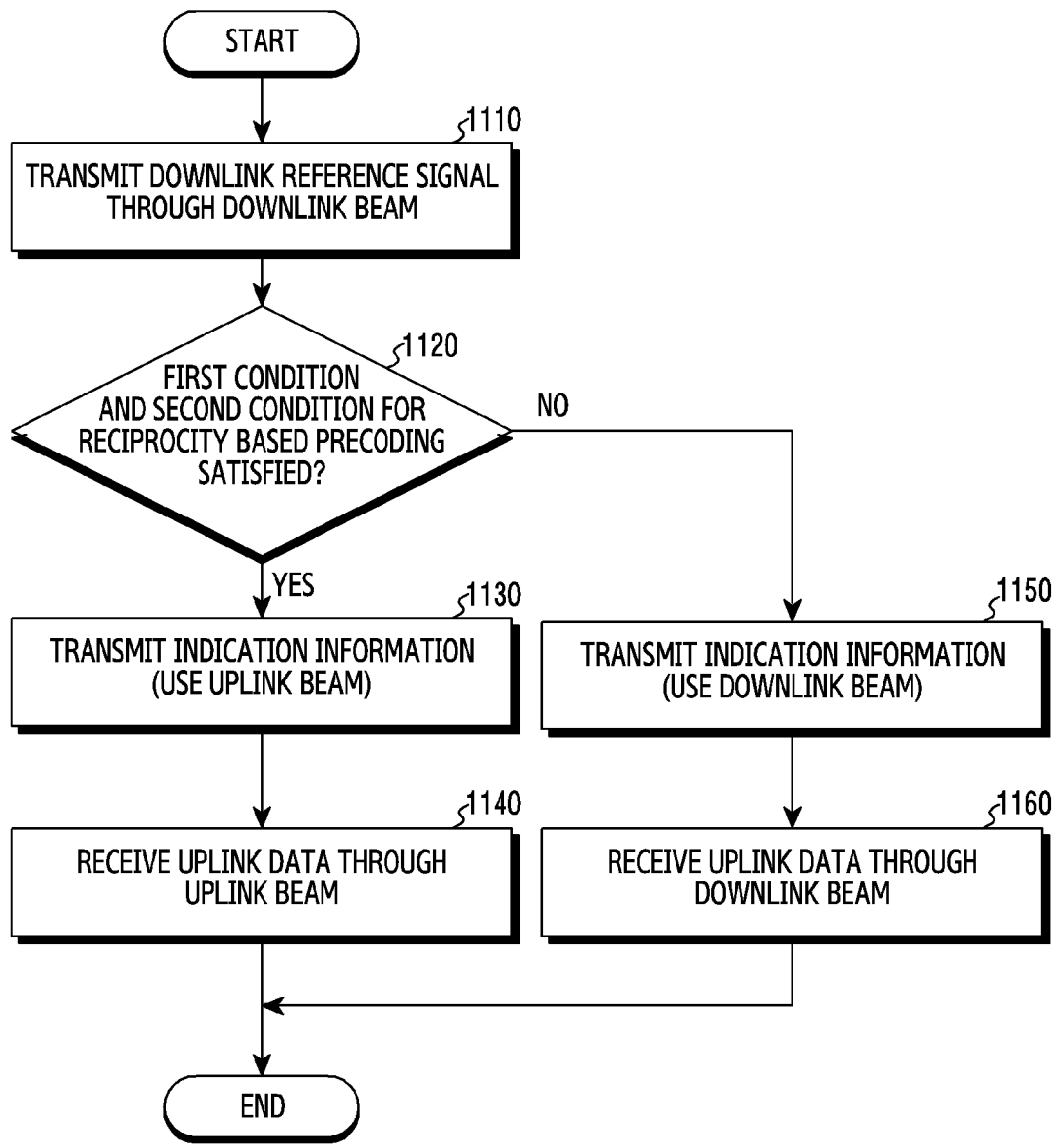
FIG. 11 illustrates an operation flow of a base station for determining a beam for uplink transmission according to various embodiments of the present disclosure.
Figure 12:
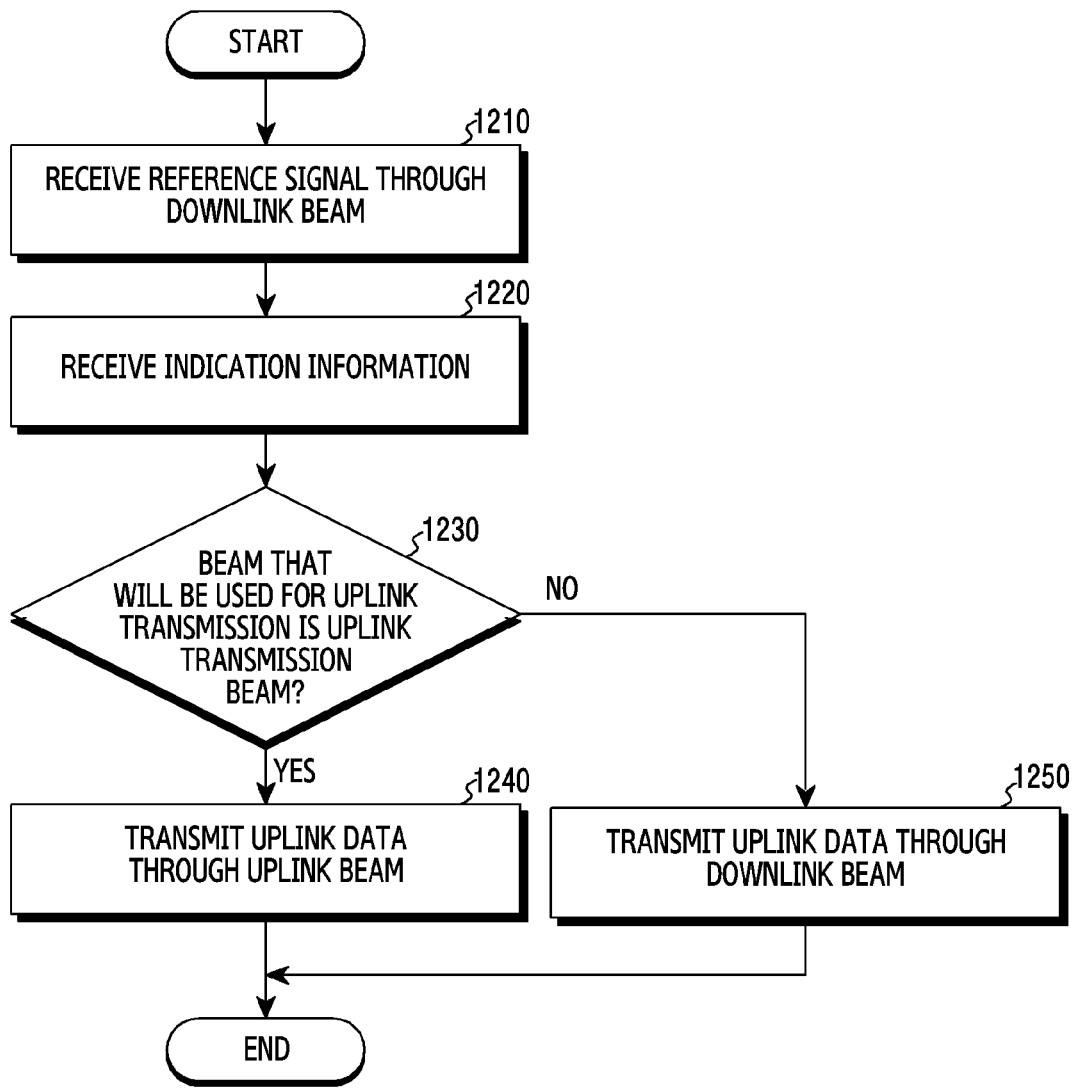
FIG. 12 illustrates an operation flow of a terminal for determining a beam for uplink transmission according to various embodiments of the present disclosure.

Below, FIG. 10 to FIG. 12 depict a way for utilizing a downlink reference signal for uplink transmission and downlink transmission, together. According to the way, in response to an uplink beam and a downlink beam being different from each other, that is, in response to beam correspondence between the base station and the terminal not being satisfied, the terminal may transmit uplink data by using the downlink beam. Here, unlike the way depicted in FIG. 7 to FIG. 9, the reference signal always presumes the transmission of a general downlink reference signal, that is, transmission through the downlink beam. The uplink data may be transmitted using one of the uplink beam or the downlink beam according to the satisfaction or non-satisfaction (utilization or non-utilization) of channel reciprocity.

FIG. 10 illustrates an example of determining a beam for uplink transmission according to various embodiments of the present disclosure. Referring to FIG. 10, the base station 510 may transmit a reference signal to the terminal 520 (1010). The reference signal may be a downlink reference signal (e.g., a CSI-RS) for obtaining a downlink channel state. The base station 510 may transmit the reference signal through a downlink transmission beam 1041.

In addition to transmission of the reference signal, the base station 510 may transmit indication information to the terminal 520. The indication information may be information representing a beam that will be used for uplink transmission of the terminal 520. The beam that will be used for uplink transmission of the terminal 520 may be a downlink beam (e.g., a beam 1042) or an uplink beam (e.g., a beam 1032). That is, the indication information may indicate one of uplink transmission using the downlink beam or uplink transmission using the uplink beam. The indication information may include at least one bit for representing a beam that will be used for uplink transmission. For example, in response to the indication information including 1-bit for representing a beam that will be used for uplink transmission, a 1-bit value '0' may indicate the uplink transmission using the uplink beam, and a 1-bit value '1' may indicate the uplink transmission using the downlink beam. In some embodiments, the indication information expressed with the 1-bit each may be information distinguished according to the utilization or non-utilization of reciprocity.

When performing uplink transmission on the basis of the indication information, the terminal 520 may determine one of the uplink beam or the downlink beam, to use the determined uplink beam or downlink beam as a transmission beam of the terminal 520. A scheme of transmitting the indication information may be one of a dynamic transmission scheme and a semi-static transmission scheme. In some embodiments, the indication information may be transmitted through DCI. At this time, a new DCI format defined and thus, the DCI format may include a field corresponding to the indication information, or use a reserved bit in a DCI field, or represent a beam that will be applied to uplink transmission through a combination of fields included in the DCI. In other some embodiments, the indication information may be transmitted through a MAC CE, In further other some embodiments, the indication information may be transmitted through higher layer signaling.

Below, a procedure of the base station 510 and the terminal 520 for determining the beam for uplink transmission described above is depicted in each of FIG. 11 and FIG. 12.

FIG. 11 illustrates an operation flow of the base station 510 for determining a beam for uplink transmission according to various embodiments of the present disclosure.

In step 1110, the base station 510 may transmit a downlink reference signal. Step 1110 corresponds to step 1010 of FIG. 10. The base station 510 may transmit the downlink reference signal through a downlink beam.

In step 1120, the base station 510 may determine whether a first condition and a second condition for reciprocity-based preceding are satisfied. Step 1120 corresponds to step 810 of FIG. 8 and thus, a detailed description of step 1120 is omitted. In response to satisfying all of the first condition and the second condition, the base station 510 may perform step 1130. On the other hand, in response to failing to satisfy at least one of the first condition or the second condition, the base station 510 may perform step 1150.

In step 1130, the base station 510 may transmit indication information to the terminal 520. Here, the indication information may indicate a beam that will be used for uplink transmission. The indication information may represent that uplink data is transmissible through an uplink beam. In an environment where beam correspondence is satisfied and channel reciprocity is guaranteed, the base station 510 may generate and transmit the indication information to the terminal 520 so as to represent that the reference signal transmitted through a downlink channel can be used for obtaining state information of an uplink channel through the uplink beam, In step 1140, the base station 510 may receive uplink data from the terminal 520 through the uplink reception beam 1031.

In step 1150, the base station 510 may transmit indication information to the terminal 520. Here, the indication information may indicate a beam that will be used for uplink transmission. The indication information may represent that, because beam correspondence is not satisfied and thus channel reciprocity is not guaranteed, it is impossible to determine an uplink precoder through the uplink beam on the basis of a downlink reference signal. Also, the indication information may represent that it is possible to determine the uplink precoder through the downlink beam on the basis of the downlink reference signal.

In step 1160, the base station 510 may receive uplink data from the terminal 520 through the downlink transmission beam 1041. In detail, the base station 510 may receive the uplink data, by using the downlink transmission beam 1041 as a reception beam. Step 1160 corresponds to step 1020 of FIG. 10.

It is illustrated that the indication information transmitted in step 1130 and step 1150 is transmitted after step 1110 that is a procedure of transmitting the reference signal in FIG. 11, but an embodiment is not limited to this. That is, the transmitting of the reference signal through the downlink beam of step 1110 may be performed after the transmitting of the indication information as well. The indication information is for determining not a beam of the reference signal but the beam that will be used for uplink transmission and thus, it is required that the base station 510 transmits the indication information to the terminal 520 before the terminal 520 transmits the uplink data.

FIG. 12 illustrates an operation flow of the terminal 520 for determining a beam for uplink transmission according to various embodiments of the present disclosure.

In step 1210, the terminal 520 may receive a downlink reference signal from the base station 510. The downlink reference signal may be a reference signal for measuring a downlink channel state. For example, the downlink reference signal may be a CSI-RS. The terminal 520 may receive the downlink reference signal through the downlink reception beam 1042.

In step 1220, the terminal 520 may receive indication information. The indication information may represent whether a beam that will be used for uplink transmission by the terminal 520 is a downlink beam (e.g., the beam 1042) or is an uplink beam (e.g., the beam 1032). In FIG. 12, it is illustrated that an operation of step 1220 is performed after the operation of step 1210, but an embodiment is not limited to this. As illustrated in FIG. 6, step 630 of transmitting the reference signal may be performed earlier than step 620 of transmitting the indication information as well. A time point of receiving the indication information is required to be before uplink transmission of the terminal 520, and an operation sequence with a procedure of receiving the reference signal may be irrelevant.

In step 1230, the terminal 520 may determine whether a beam that will be used for uplink transmission is an uplink beam (e.g., the beam 1032) from the indication information. In response to the beam that will be used for uplink transmission being the uplink beam, the terminal 520 may perform step 1240. In response to the beam that will be used for uplink transmission being a downlink beam, the terminal 520 may perform step 1250.

In step 1240, the terminal 520 may transmit uplink data through the uplink beam. The indication information of step 1230 indicates uplink transmission through the uplink beam and thus, the terminal 520 may determine that channel reciprocity is utilizable from the indication information. The terminal 520 may determine a precoder for uplink transmission from the reference signal transmitted through downlink. By applying the determined precoder through digital beamforming and forming an uplink beam through analog beamforming, the terminal 520 may transmit the uplink data. The channel reciprocity and the beam correspondence are satisfied and thus, the uplink transmission beam corresponds to a downlink reception beam.

In step 1250, the terminal 520 may transmit uplink data through a downlink beam. The terminal 520 may transmit the uplink data, by using, as a transmission beam, a beam of the same index as that of the downlink beam 1042 determined in a beam management procedure. The reference signal received in step 1210 has been transmitted through downlink beams (e.g., the beam 1041 and the beam 1042) and thus, the terminal 520 may determine an uplink precoder of the uplink data that will be transmitted through the downlink beam, on the basis of the reference signal. By applying the determined uplink precoder, the terminal 520 may transmit the uplink data through the downlink beam.

Indication of Measurement Scheme for Uplink Precoding

Figure 14:
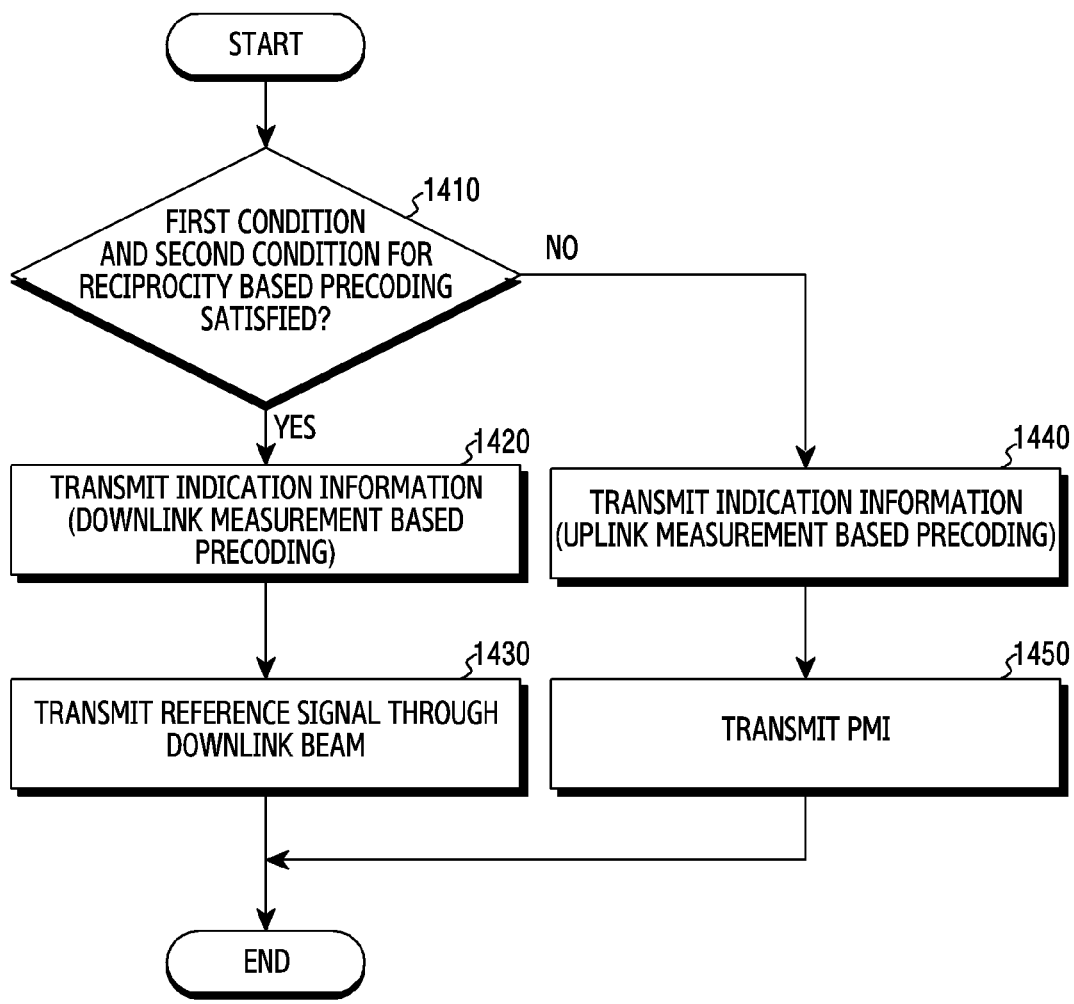
FIG. 14 illustrates an operation flow of a base station for indicating a precoder determination scheme according to various embodiments of the present disclosure.
Figure 15:
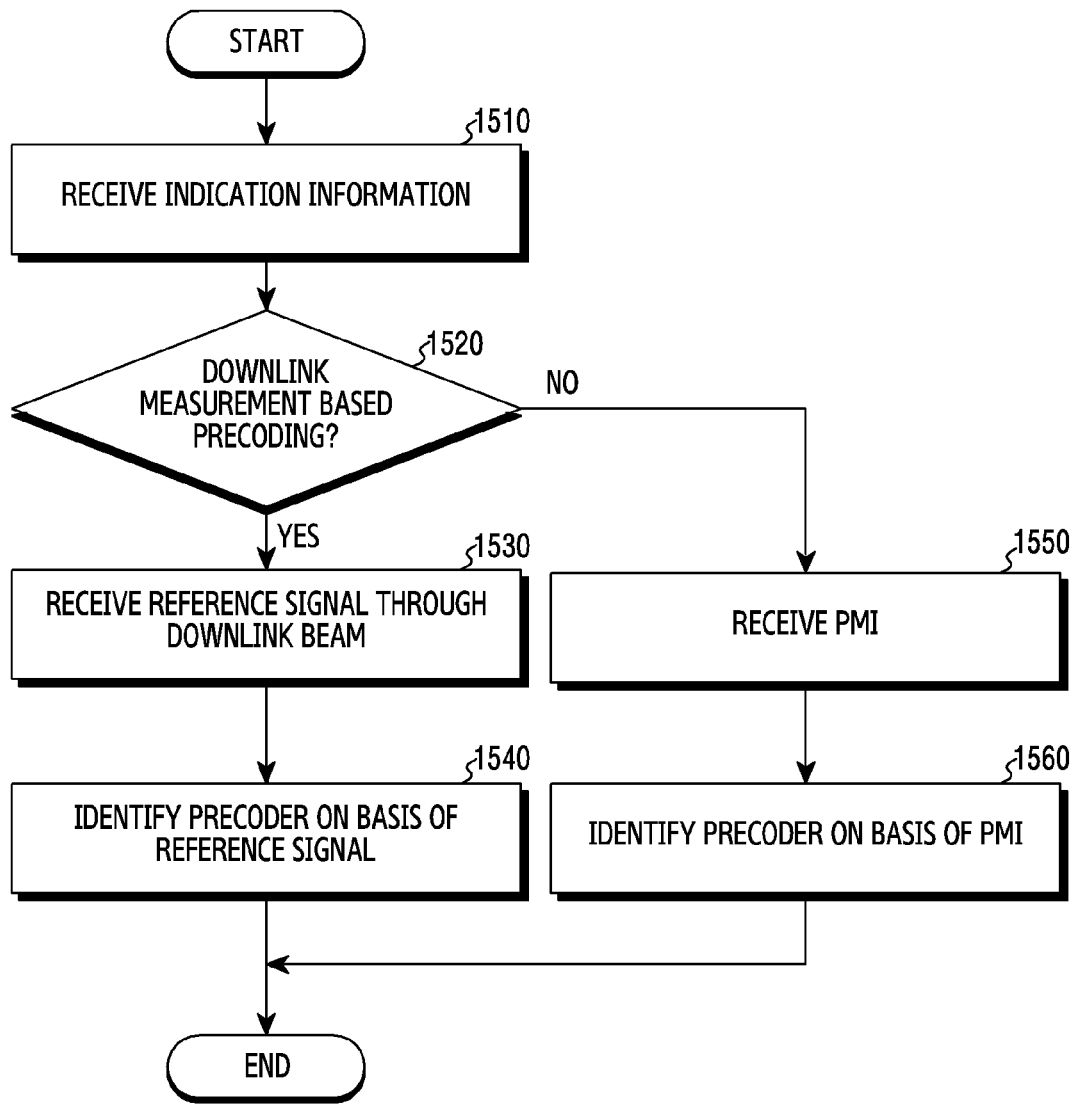
FIG. 15 illustrates an operation flow of a terminal for indicating a precoder determination scheme according to various embodiments of the present disclosure.

Below, FIG. 13 to FIG. 15 explain a way in which a base station indicates, to a terminal, a measurement scheme for precoding. The base station determines which scheme the terminal will use among measurement (downlink measurement) using a downlink reference signal (e.g., a CSI-RS) or measurement (uplink measurement) using an uplink reference signal, and notify the determined scheme to the terminal.

Figure 13:
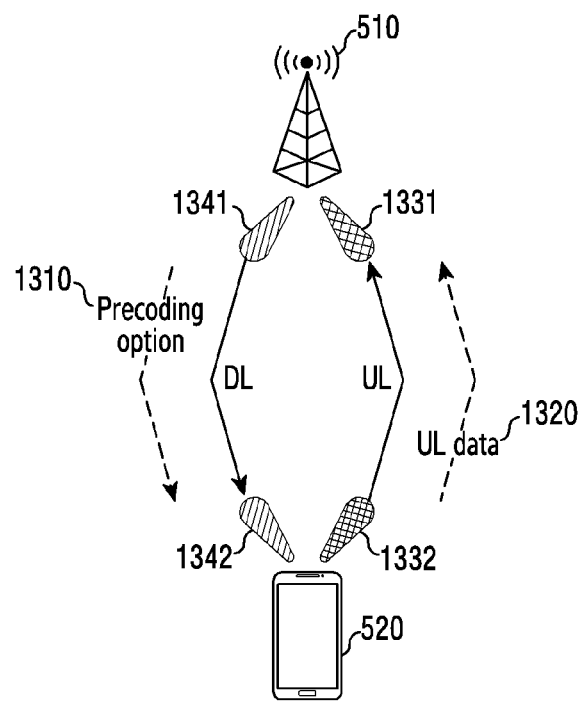
FIG. 13 illustrates an example of indicating a precoder determination scheme according to various embodiments of the present disclosure.

FIG. 13 illustrates an example of indicating a precoder determination scheme according to various embodiments of the present disclosure. Referring to FIG. 13, the base station 510 may transmit indication information to the terminal 520 (1310). Here, the indication information may include information representing a measurement scheme for precoding. The content of the indication information is given below.

Option 1: uplink measurement based precoding
Option 2: downlink measurement based precoding The uplink measurement based precoding of option 1 refers to an operation of measuring an uplink channel by using an uplink reference signal, and performing precoding for uplink data on the basis of the measurement result. The downlink measurement based precoding of option 2 refers to an operation of measuring a downlink channel by using a downlink reference signal, and performing precoding, for uplink data on the basis of the measurement result. Unlike option 1, option 2 may presume that utilization of reciprocity is possible, in that the measurement result is a downlink channel whereas data to which precoding is applied is uplink. In some embodiments, the indication information indicating option 1 and option 2 may each be information distinguished according to the utilization or non-utilization of reciprocity.

The base station 510 may select one of option 1 and option 2, to transmit indication information indicating the selected option to the terminal 520. A detailed operation is depicted in FIG. 14. FIG. 14 illustrates an operation flow of the base station 510 for indicating a precoder determination scheme according to various embodiments of the present disclosure.

In step 1410, the base station 510 may determine whether a first condition and a second condition for reciprocity-based precoding are satisfied. Step 1410 corresponds to step 810 of FIG. 8 and thus, a detailed description of step 1410 is omitted. In response to satisfying all of the first condition and the second condition, the base station 510 may perform step 1420. On the other hand, in response to failing to satisfy at least one of the first condition or the second condition, the base station 510 may perform step 1440.

In step 1420, the base station 510 may transmit indication information to the terminal 520. The indication information may represent option 2. Through the indication information, the base station 510 may indicate that the terminal 520 determines a precoder from the measurement of a downlink reference signal.

In step 1430, the base station 510 may transmit a reference signal through a downlink beam (e.g., the beam 1341). The beam correspondence and the channel reciprocity are satisfied in step 1410 and thus, the measurement result of the reference signal transmitted through the downlink beam may be used for determining of a precoder of uplink transmission. Accordingly, the base station 510 may transmit the reference signal through the downlink transmission beam 1341.

In step 1440, the base station 510 may transmit indication information to the terminal 520. The indication information may represent option 1. Through the indication information, the base station 510 may instruct to determine a precoder on the basis of a PMI.

In step 1450, the base station 510 may transmit a PMI to the terminal 520. Although not illustrated in FIG. 14, the terminal 520 may transmit an uplink reference signal (e.g., an SRS) to the base station 510. At this time, the uplink reference signal may be transmitted through an uplink beam (e.g., the beam 1332), and the base station 510 may receive the uplink reference signal through an uplink bean (e.g., the beam 1331). The base station 510 may receive the uplink reference signal, to measure an uplink channel. In accordance with the measurement result, the base station 510 may determine a PMI for the uplink channel. The base station 510 may transmit the determined PMI to the terminal 520 through a CSI.

On the other hand, as a way for indicating a scheme of determining a precoder for uplink transmission through step 1420 and step 1440, two ways described later may be considered.

Embodiment 1: 1-Bit Indication

The base station 510 may indicate whether, when determining a precoder for uplink transmission through a separate 1-bit, the terminal 520 will use a downlink reference signal (downlink measurement) or will use a PMI forwarded from the base station 510 (uplink measurement). The indication information including the 1-bit may be transmitted from the base station 510 to the terminal 520 through DCI, a MAC CE, or higher layer signaling, as in embodiments of transmitting indication information representing a use of a reference signal of FIG. 7 or a beam used for uplink transmission of FIG. 10. In some embodiments, the indication information may serve as the same indication information as the indication information depicted in FIG. 7. A field representing the utilization or non-utilization of channel reciprocity may be defined. By using the field, the base station may transmit, to the terminal, indication information which indicates a use of a reference signal (or a transmission beam of the reference signal) and concurrently represents whether precoding is an uplink basis or is a downlink basis.

Embodiment 2: PMI Indication

The base station 510 may indicate whether, when determining a precoder for uplink transmission through a separate PMI index, the terminal 520 will use a downlink reference signal (downlink measurement) or will use a PMI forwarded form the base station 510 (uplink measurement). In response to the base station 510 instructing the terminal 520 to use the PMI forwarded from the base station 510 (uplink measurement based precoding), the base station 510 may transmit a PMI index indicating a precoder that will be applied for uplink transmission. To the contrary, in response to the base station 510 instructing the terminal 520 to determine a precoder for uplink transmission by using the downlink reference signal (downlink measurement based precoding), the base station 510 may transmit a separate index. For example, the PMI may indicate one of precoding matrixes of a number 0 to a number 15 of a codebook. The base station 510 may transmit a separate index indicating a number 16 to the terminal 520. The terminal 520 may determine whether the received index indicates the precoding matrix of the codebook. In response to the terminal 520 receiving the separate index, the terminal 520 may determine the precoder from the downlink reference signal. The separate index may be a PIM index for reciprocity based precoding. In the corresponding embodiment, a separate indication procedure may be omitted. Accordingly, by transmitting the indication information in step 1420 of FIG. 14, the terminal 520 may transmit a PIM index for reciprocity based precoding. Also, step 1440 may be omitted.

In response to receiving information indicating a scheme of determining a precoder for uplink transmission, the terminal 520 may determine an uplink precoder as indicated. The terminal 520 may determine the uplink precoder on the basis of a downlink reference signal, or determine the uplink precoder on the basis of a PMI received from the base station 510. In detail, the terminal 520 may determine the precoder for uplink transmission, according to a procedure illustrated in FIG. 15. FIG. 15 illustrates an operation flow of the terminal 520 for indicating a precoder determination scheme according to various embodiments of the present disclosure.

In step 1510, the terminal 520 may receive information indicating a precoder determining scheme.

In step 1520, the terminal 520 may determine whether the indicated precoder determination scheme is a downlink reference signal based scheme. In response to the indicated precoder determination scheme being the downlink reference signal based scheme, the terminal 520 may perform step 1530, and otherwise (the indicated precoder determination scheme is a PMI based scheme), may perform step 1550.

In step 1530, the terminal 520 may receive a reference signal through a downlink reception beam.

In step 1540, the terminal 520 may determine a precoder for uplink transmission from the received reference signal. According to the indication of the information received in step 1510, the terminal 520 may determine that beam correspondence and channel reciprocity are guaranteed. The terminal 520 may determine that a reference signal transmitted through a downlink beam, i.e., a reference signal transmitted through a downlink channel is used for determining of a precoder for an uplink channel. By using the channel reciprocity, by using the measurement result of the reference signal, the terminal 520 may determine the precoder. Although not illustrated in FIG. 15, by applying the determined precoder, the terminal 520 may transmit uplink data to the base station 510 through an uplink beam (or a downlink beam). The beam correspondence is satisfied and thus, the uplink beam and the downlink beam are consistent unlike illustrated in FIG. 13.

In step 1550, the terminal 520 may receive a PMI the base station 510. Here, the PMI means an index of a preceding matrix which is determined by the base station 510 from an uplink reference signal (e.g., an SRS) the terminal 520 transmits to the base station 510. Although not illustrated in FIG. 15, the terminal 520 may transmit the uplink reference signal to the base station 510. The terminal 520 may transmit the uplink reference signal through an uplink beam (e.g., the beam 1332). The uplink reference signal may be a reference signal for determining a state of an uplink channel.

In step 1560, the terminal 520 may determine a precoder as indicated by the PMI received from the base station 510. Although not illustrated in FIG. 15, by applying the determined precoder, the terminal 520 may transmit uplink data to the base station 510 through an uplink beam.

The terminal 520 may determine a precoder for uplink transmission, and apply the determined precoder, to transmit uplink data to the base station 510 (1320). All of option 1 and option 2 draw the measurement result of a channel state through an uplink beam and thus, the uplink data may be transmitted through the uplink beam. The terminal 520 may transmit the uplink data to the base station 510 through the uplink transmission beam 1332. The base station 510 may receive the uplink data from the terminal 520 through the uplink reception beam 1331.

Indicating of Use of Uplink PMI

Figure 17:
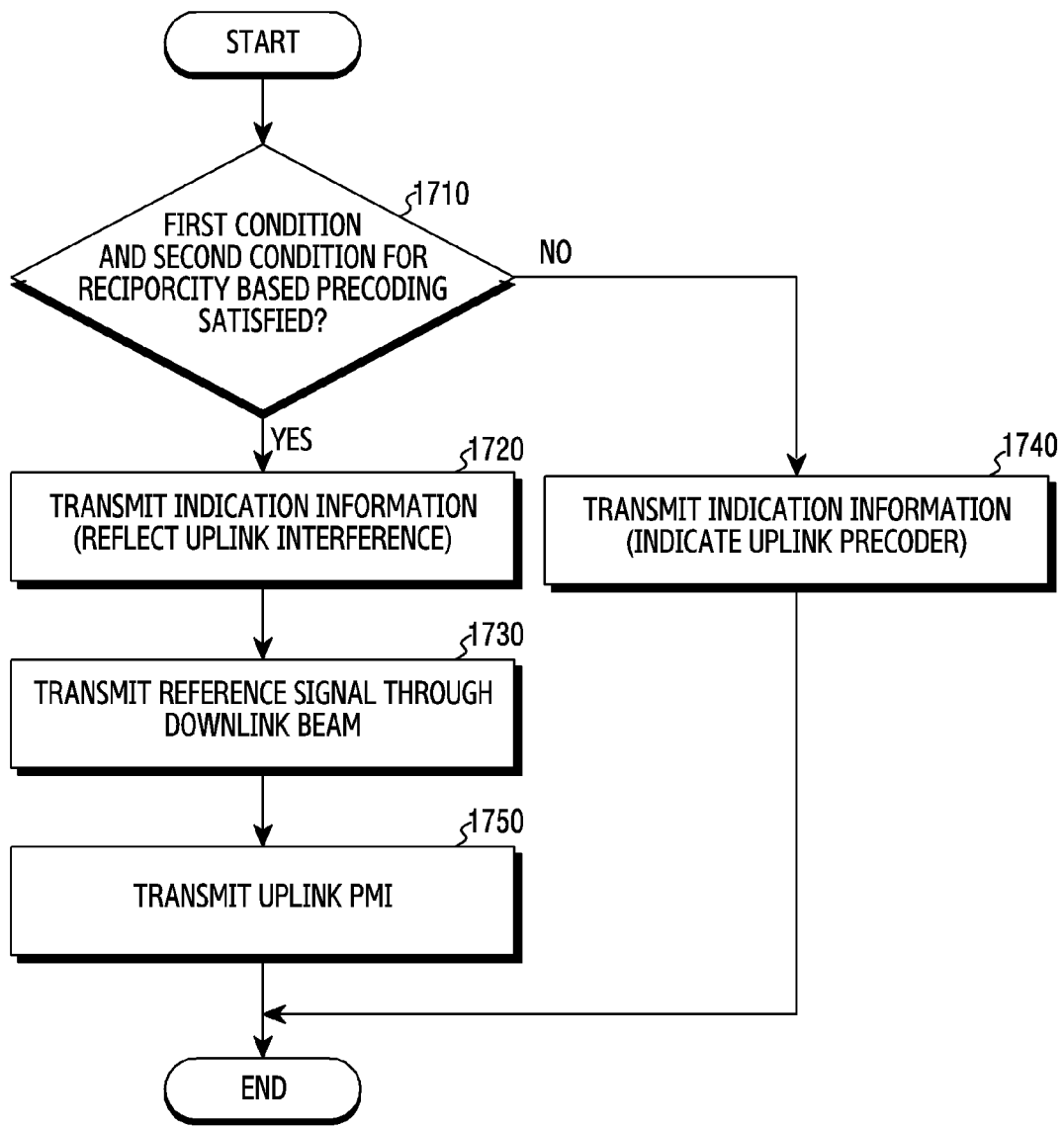
FIG. 17 illustrates an operation flow of a base station for indicating a function of a PMI according to various embodiments of the present disclosure.
Figure 18:
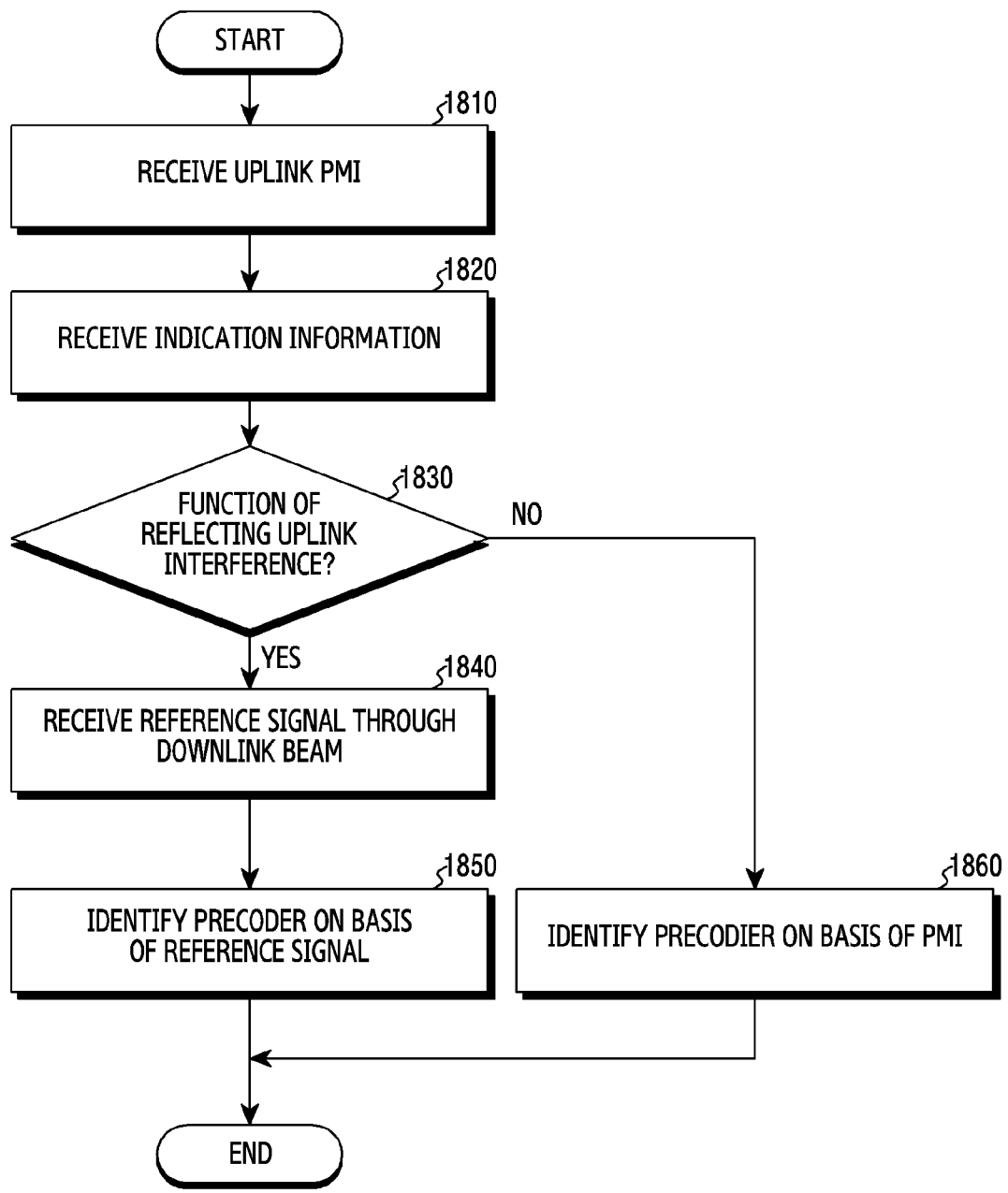
FIG. 18 illustrates an operation flow of a terminal for indicating a function of a PMI according to various embodiments of the present disclosure.

Below, FIG. 16 to FIG. 18 explain a way in which, when a base station transmits an uplink to a terminal, the base station indicates, to the terminal, a use (or function) of the transmitted uplink PMI in uplink transmission. The base station may determine which function among a function used for reflecting an uplink interference or a function of indicating a precoder (below, an uplink precoder) that will be applied to the uplink transmission is a function of the uplink PMI, and notify the determined function to the terminal.

Figure 16:
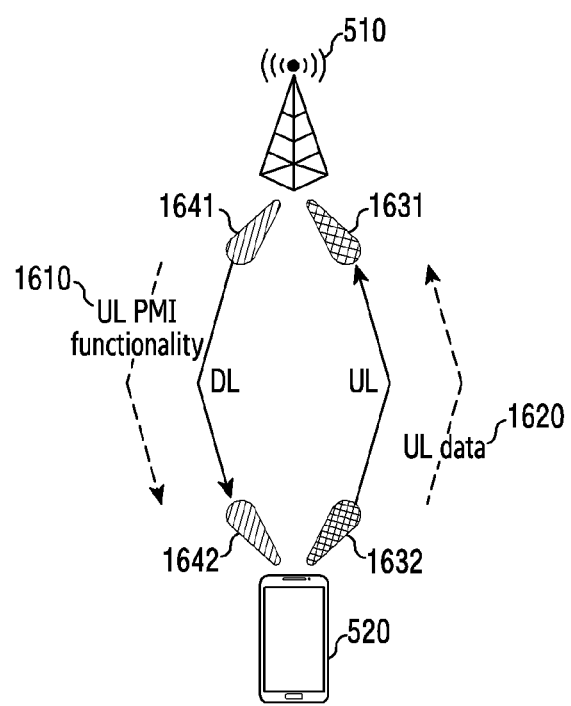
FIG. 16 illustrates an example of indicating a function of a preceding matrix indicator (PMI) according to various embodiments of the present disclosure.

FIG. 16 illustrates an example of indicating a function of an uplink PMI according to various embodiments of the present disclosure. Referring to FIG. 16, the base station 510 may transmit indication information to the terminal 520. (1610) Here, the indication information may include information representing the function of the uplink PMI. The content of the indication information is given below.

Option 1: uplink PMI for reflecting the influence of uplink interference

Option 2: uplink PMI for indicating an uplink precoding matrix

The base station 510 may select one of option 1 and option 2, to transmit indication information indicating the selected option to the terminal 520. A detailed operation is depicted in FIG. 17. FIG. 17 illustrates an operation flow of the base station 510 for indicating a function of a PMI according to various embodiments of the present disclosure.

In step 1710, the base station 510 may determine whether a first condition and a second condition for reciprocity-based precoding are satisfied. Step 1710 corresponds to step 810 of FIG. 8 and thus, a detailed description of step 1710 is omitted. In response to satisfying all of the first condition and the second condition, the base station 510 may perform step 1720. On the other hand, in response to failing to satisfy at least one of the first condition or the second condition, the base station 510 may perform step 1740.

In step 1720, the base station 510 may transmit indication information to the terminal 520. The indication information may indicate option 1. In other words, the base station 510 may notify the terminal 520 that the uplink PMI is a use for reflecting an uplink interference. As determined in step 1710, the base station 510 may determine that a link with the terminal 520 satisfies beam correspondence, and utilization of channel reciprocity is available. As the channel reciprocity is guaranteed, the base station 510 may instruct the terminal 520 to calculate an uplink precoder on the basis of downlink measurement, through the indication information.

Why the uplink PMI is required even when the channel reciprocity is satisfied is for reflecting the influence of uplink interference. In response to the channel reciprocity being satisfied, the terminal 520 cannot measure the uplink interference, because determining a precoder for uplink transmission from a downlink reference signal. Accordingly, the base station 510 measures the uplink interference and then transmits the uplink PMI to the terminal 520, whereby the terminal 520 may reflect the uplink interference obtained from the uplink PMI, to determine the precoder for uplink transmission.

In step 1730, the base station 510 may transmit a reference signal to the terminal 520 through a downlink beam. As determining that the channel reciprocity is satisfied, the base station 510 may transmit the reference signal to the terminal 520 wherein the uplink precoder is determined on the basis of the reference signal transmitted through the downlink beam.

In step 1740, the base station 510 may transmit indication information to the terminal 520. The indication information may indicate option 2. In other words, the base station 510 may notify the terminal 520 that the uplink PMI is a use for indicating a precoding matrix applied for uplink transmission. As determined in step 1710, the base station 510 may determine that a link with the terminal 520 does not satisfy the beam correspondence, and the channel reciprocity is not guaranteed.

In step 1750, the base station 510 may transmit the uplink PMI to the terminal 520. The terminal 520 performing step 1750 after performing step 1730 may determine an uplink precoder through a downlink reference signal, because the channel reciprocity is satisfied. But, because failing to consider the influence of interference generated at actual uplink transmission, the base station 510 may transmit an uplink PMI for the terminal 520's considering an uplink interference, to the terminal 520.

The terminal 520 performing step 1750 after performing step 1740 cannot determine the uplink precoder from the downlink reference signal, because the cha reciprocity is not satisfied. Accordingly, the base station 510 may receive the uplink reference signal transmitted from the terminal 520, and measure the received reference signal, to determine the uplink PMI. The uplink PMI may be an index indicating the uplink precoder. The base station 510 may feed back the determined uplink PMI to the terminal 520.

Step 1750 is an operation of transmitting the uplink PMI, and the uplink PMI may be transmitted irrespective of a sequence of transmission of the indication information. For example, unlike illustrated in FIG. 17, the base station 510 may transmit the uplink PMI before step 1710 as well.

On the other hand, as in step 1720 and step 1740, the base station 510 may transmit the indication information to the terminal 520 wherein the terminal 520 can recognize which option among the two options has been selected. The indication information may indicate a function of an uplink PMI, and the indicated function is one of two functions (uplink interference reflection or uplink precoder indication) and thus may be indicated through at least one bit. As in embodiments of transmitting the indication information representing a use of a reference signal of FIG. 7 or a beam used in uplink transmission of FIG. 10, the indication information including the at least one bit may be transmitted from the base station 510 to the terminal 520 through DCI, a MAC CE, or higher layer signaling.

In some embodiments, the indication information may serve as the same indication information as the indication information depicted in FIG. 7. A field representing the utilization or non-utilization of channel reciprocity may be defined. By using the field, the base station may transmit, to the terminal, indication information indicating a use of a reference signal (or a transmission beam of the reference signal) and concurrently representing for which use a received uplink PMI is utilized.

In response to receiving information indicating a function of an uplink PMI, the terminal 520 may determine an uplink precoder as indicated. The terminal 520 may determine the precoder in consideration of a downlink reference signal and the influence of interference included in a PMI received from the base station 510, or determine the precoder on the basis of the PMI received from the base station 510. A concrete operation of determining the precoder in the terminal 520 is performed according to a procedure of FIG. 18. FIG. 18 illustrates an operation flow of the terminal 520 for indicating a function of a PMI according to various embodiments of the present disclosure.

In step 1810, the terminal 520 may receive an uplink PMI. On the other hand, an operation of transmitting an uplink PIM as described in step 1750 of FIG. 17 is not restricted to an operation and sequence of transmission of indication information. Accordingly, unlike illustrated in FIG. 18, the base station 510 may transmit the uplink PMI after step 1830 as well.

In step 1820, the terminal 520 may receive indication information from the base station 510. The indication information may be indication information representing a function of an uplink PMI.

In step 1830, the terminal 520 may determine whether the function of the uplink PMI is a function for reflecting an uplink interference on the basis of the indication information. For example, the terminal 520 may determine that the function of the uplink PMI is the function for reflecting the uplink interference in response to a value of a 1-bit indicator included in the received indication information being equal to '1', and the function of the uplink PMI is a function for indicating an uplink precoder in response to the value of the 1-bit indicator being equal to '0'. In response to the function of the uplink PMI being the function for reflecting the uplink interference, the terminal 520 may perform step 1840. If response to the function of the uplink PMI being the function for indicating the uplink precoder, the terminal 520 may perform step 1860.

In step 1840, the terminal 520 may receive a reference signal (e.g., a CSI-RS) through a downlink beam. The terminal 520 may receive the reference signal through a downlink reception beam.

In step 1850, the terminal 520 may determine a precoder for uplink transmission on the basis of the received reference signal. According to the indication of the information received in step 1820, the terminal 520 may determine that beam correspondence and channel reciprocity are guaranteed. The terminal 520 may determine an uplink precoder by using the reference signal transmitted through the downlink beam, i.e., the reference signal transmitted through the downlink channel. But, the influence of uplink interference is not measured from the measurement of the downlink reference signal. The terminal 520 may draw the influence of uplink interference from the uplink PMI received from the base station 510 in step 1810, and determine the uplink precoder by using the drawn result.

In step 1860, the terminal 520 may determine, as the uplink precoder, a preceding matrix indicated by the uplink PMI received in step 1810.

The terminal 520 may determine a precoder for uplink transmission, and apply the determined (or calculated) precoder, to transmit uplink data to the base station 510 (1620). All of option 1 and option 2 draw the measurement result of a channel state through an uplink beam and thus, the uplink data may be transmitted through the uplink beam.

Indicating of Uplink Transmission Scheme

Below, FIG. 19 to FIG. 21 explain a way in which a base station indicates an uplink transmission scheme to a terminal. The base station may dynamically alter the uplink transmission scheme. The base station may determine the uplink transmission scheme according to the satisfaction or non-satisfaction of a first condition and a second condition for reciprocity-based precoding, that is, whether an uplink beam and a downlink beam are identical with each other and whether a base station coupled for downlink with the terminal is identical with a base station coupled for uplink with the terminal.

Figure 19:
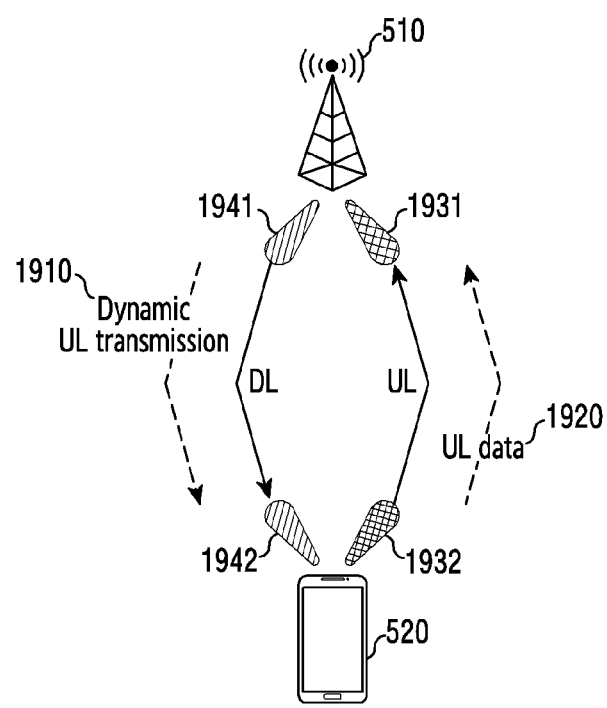
FIG. 19 illustrates an example of indicating an uplink transmission scheme according to various embodiments of the present disclosure.

FIG. 19 illustrates an example of indicating an uplink transmission scheme according to various embodiments of the present disclosure. Referring to FIG. 19, the base station 510 may transmit indication information to the terminal 520 (1910). The indication information may indicate whether the uplink transmission scheme is a codebook based uplink transmission scheme (below, a codebook based scheme) or is a non-codebook based uplink transmission scheme (below, a non-codebook based scheme). The base station 510 may determine the uplink transmission scheme. A concrete operation of the base station 510 is depicted in FIG. 20. FIG. 20 illustrates an operation flow of the base station 510 for indicating the uplink transmission scheme according to various embodiments of the present disclosure.

In step 2010, the base station 510 may determine whether a first condition and a second condition for reciprocity-based precoding are satisfied. Step 2010 corresponds to step 810 of FIG. 8 and thus, a detailed description of step 2010 is omitted. In response to satisfying all of the first condition and the second condition, the base station 510 may perform step 2020. On the other hand, in response to failing to satisfy at least one of the first condition or the second condition, the base station 510 may perform step 2030.

In step 2020, the base station 510 may determine, that is, select one of a codebook based scheme and a non-codebook based scheme. The base station 510 may determine that channel reciprocity with the terminal 520 is satisfied according to the determining result of step 2010. Because the channel reciprocity is guaranteed, the base station 510 may select the non-codebook based scheme of determining an uplink precoder through a downlink reference signal. Also, to decrease an calculation amount of the terminal 520 and reduce a PMI overhead, the base station 510 may select the codebook based scheme as well.

In step 2030, the base station 510 may be required to use the codebook-based scheme rather than a way of using the non-codebook based scheme, in advantageous aspect for uplink transmission, because a channel with the terminal 520 fails to satisfy beam adaptability, and channel reciprocity is not guaranteed. Accordingly, the base station 510 may select the codebook-based scheme.

In step 2040, the base station 510 may transmit, to the terminal 520, indication information representing whether it is the codebook based transmission scheme or the non-codebook based scheme among transmission schemes used for uplink transmission. The indication information may include 1-bit representing a transmission scheme. The transmission scheme has to be indicated adaptively or dynamically and thus, the base station 510 may transmit the indication information through DCI or a MAC CE. In some embodiments, a new DCI format including a field representing an uplink transmission scheme may be defined. In other some embodiments, a rule representing a specific uplink transmission scheme (e.g., the non-codebook based scheme) may be defined through another field of the DCI as well.

Figure 20:
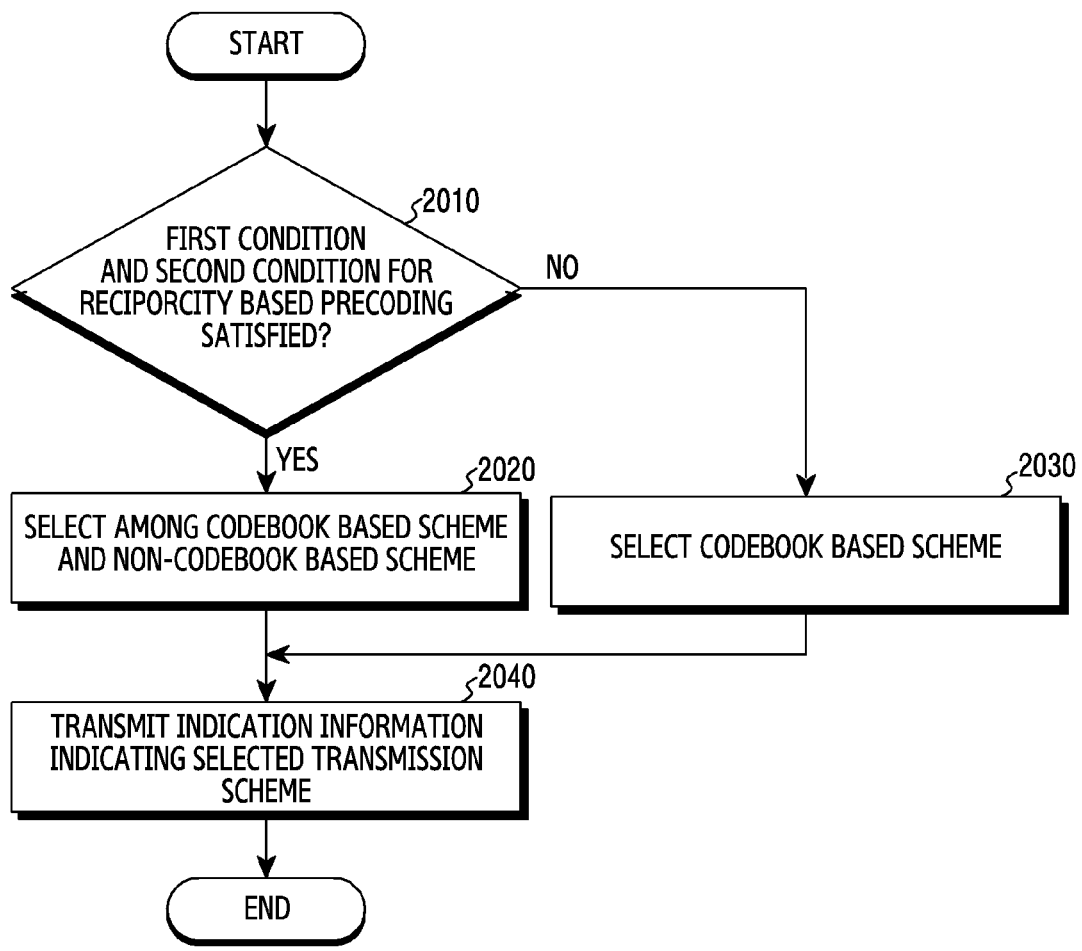
FIG. 20 illustrates an operation flow of a base station for indicating an uplink transmission scheme according to various embodiments of the present disclosure.

On the other hand, unlike illustrated in FIG. 20, the uplink transmission scheme may not be limited to the codebook based scheme and the non-codebook based scheme. Besides the two transmission schemes, more transmission schemes may be considered. In some embodiments, the base station 510 may select or alter the transmission scheme, to indicate this to the terminal 520. At this time, the number of bits included in information for indicating to the terminal 520 may be determined according to the entire number of transmission schemes taken into consideration. The transmission schemes may include a diversity transmission scheme, a codebook based scheme, and a non-codebook based scheme. The selecting or altering of the transmission scheme may be performed based on the satisfaction or non-satisfaction of beam correspondence or the use or non-use of channel reciprocity.

In some embodiments, information indicating a transmission mode may be transmitted from the base station 510 to the terminal 520. For example, the information indicating the transmission mode may be 1-bit information distinguishing the codebook based scheme and the non-codebook based scheme. For another example, the information indicating the transmission mode may be indication information indicating one of a predefined plurality of transmission modes. Here, the plurality of transmission modes may not only divided into the codebook based scheme and the non-codebook based scheme but also may include transmission modes which are additionally identified according to the number of used layers, the number of antennas, and whether it is a closed loop scheme or not.

Figure 21:
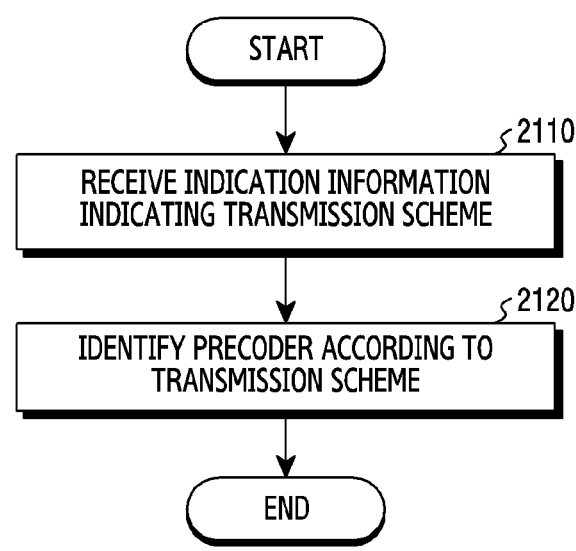
FIG. 21 illustrates an operation flow of a terminal for indicating an uplink transmission scheme according to various embodiments of the present disclosure.

FIG. 21 illustrates an operation flow of the terminal 520 for indicating an uplink transmission scheme according to various embodiments of the present disclosure.

In step 2110, the terminal 520 may receive information indicating the uplink transmission scheme. The indicated transmission scheme may be one of a codebook based precoding scheme, a non-codebook based precoding scheme, and a diversity scheme.

In step 2120, the terminal 520 may determine an uplink precoder according to the indicated transmission scheme. For example, in response to the transmission scheme being the codebook based communication scheme, the terminal 520 may transmit a reference signal to the base station 510, and receive feedback information from the base station 510, to obtain a PMI. The terminal 520 may determine a precoder indicated by the PMI.

By applying the precoder determined in step 2120 to uplink symbols intended to be transmitted, the terminal 520 may generate uplink data, and transmit the generated uplink data (1920).

FIG. 6 to FIG. 21 depict operations of a base station and a terminal for uplink transmission, in a non-codebook based precoding operation. Below, FIG. 22 to FIG. 28 depict operations of the terminal and the base station for downlink transmission.

Reciprocity-Based Downlink Transmission

Figure 22:
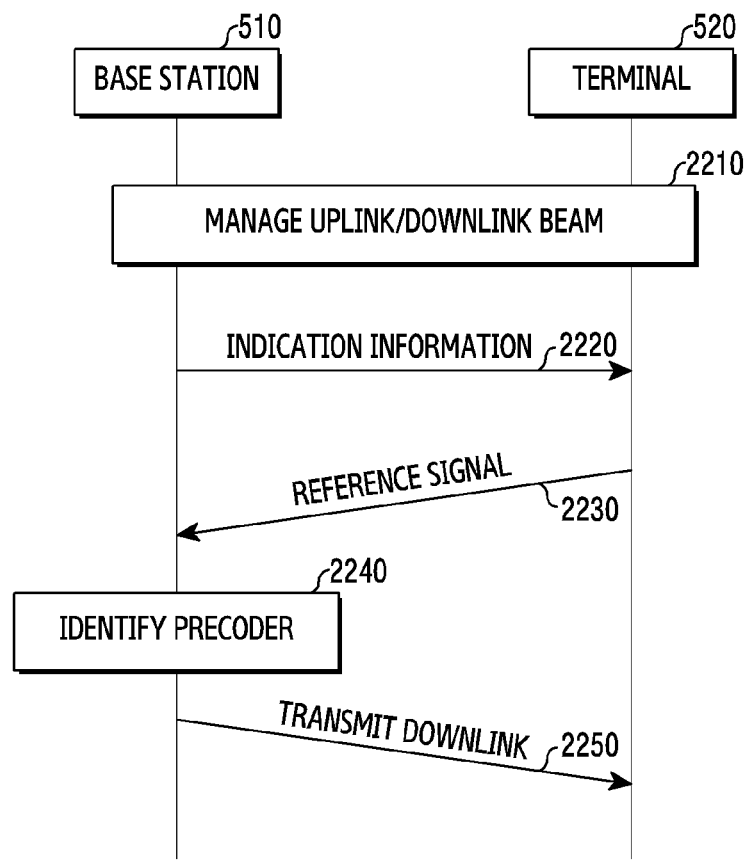
FIG. 22 illustrates a downlink transmission procedure according to various embodiments of the present disclosure.

FIG. 22 illustrates a downlink transmission procedure according to various embodiments of the present disclosure.

Referring to FIG. 22, in step 2210, the base station 510 and the terminal 520 may determine a beam that will be used in uplink and/or downlink. Step 2210 corresponds to step 610 of FIG. 6 and thus, a concrete description is omitted.

In step 2220, the base station 510 may transmit indication information for reciprocity-based precoding to the terminal 520. The indication information may indicate an operation required for downlink transmission. The required operation may include a beamforming operation of setting a transmission beam for transmitting a reference signal, a reception beamforming operation for data reception, an operation of transmitting an uplink reference signal, and an operation of setting a codebook.

In some embodiments, the indication information may include information representing a use of a reference signal which is transmitted to determine a precoder. The precoder may be a precoder (below, a downlink precoder) which will be applied to downlink transmission going from the base station 510 to the terminal 520. The reference signal may be an uplink reference signal transmitted from the terminal 520 in step 2230 described later. The indication information may represent whether the uplink reference signal is a use used for downlink transmission, or is a use used for uplink transmission, or is a use used for all of downlink transmission and uplink transmission. Here, being the use used for all of the downlink transmission and the uplink transmission may mean that channel reciprocity is satisfied. In accordance with the use of the uplink reference signal, not only a beam of the terminal 520 transmitting the reference signal, but also a beam of the base station 510 for receiving the reference signal may become different.

In other some embodiments, the indication information may include information indicating a beam that will be used in downlink transmission. The beam may be a beam determined in step 2210. The terminal 520 may determine, from the indication information, the uplink transmission beam or downlink reception beam determined in step 2210 as the beam that will be used in downlink transmission.

On the other hand, the indication information may include information for requesting a reference signal that will be transmitted in step 2230 described later. The information for requesting may be information for requesting the transmission of an aperiodic reference signal (e.g., an aperiodic SRS) to the terminal 520.

In step 2230, the terminal 520 may transmit a reference signal to the base station 510. Each of the base station 510 and the terminal 520 may perform step 2230 through the beam determined in step 2210. In some embodiments, the base station 510 may receive the reference signal through the uplink transmission beam determined in step 2210. The terminal 520 may transmit the reference signal through the uplink reception beam determined in step 2210. In other some embodiments, the base station 510 may receive the reference signal, by using, as a reception beam, the downlink transmission beam determined in step 2210. The terminal 520 may transmit the reference signal, by using, as a transmission beam, the downlink reception beam determined in step 2210. The reference signal may be a reference signal for estimating a channel. For example, the reference signal may be an SRS.

The reference signal may be an aperiodic reference signal in which transmission is triggered according to the indication information of step 2220 or a separately executed request, or be a periodic reference signal (e.g., a periodic SRS) periodically transmitted according to a set scheme. On the other hand, in response to the reference signal being the periodic reference signal, the information for requesting described above may be omitted.

FIG. 22 illustrates that the transmission of the indication information of step 2220 is performed earlier than the transmission of the reference signal of step 2230, but an embodiment is not limited to this. In accordance with information included in the indication information, a transmission time of the indication information may be determined. For example, in response to the indication information including information applied to the reference signal transmitted in step 2230, it may be required that step 2220 is first performed as illustrated in FIG. 22. But, in response to the indication information including information applied to downlink transmission, an embodiment is not limited to a sequence illustrated in FIG. 22.

In step 2240, the base station 510 may determine a precoder that will be used for downlink transmission. The base station 510 may determine the precoder (below, a downlink precoder) for downlink transmission on the basis of the reference signal transmitted in step 2230 according to reciprocity use or non-use, or determine the precoder (below, a downlink precoder) for downlink transmission from a PMI included in feedback information received from the terminal 520.

In step 2250, the base station 510 may perform downlink transmission. The base station 510 may transmit downlink data to the terminal 520. By applying the determined precoder to downlink data symbols intended to be transmitted, the base station 510 may transmit downlink data to the terminal 520.

According to various embodiments of the present disclosure, a device of a base station may include at least one processor and at least one transceiver for transmitting, to a terminal, indication information which is determined according to whether channel reciprocity with the terminal is satisfied and which is for controlling a beamforming operation of the terminal, and receiving, from the terminal, a reference signal, and transmitting downlink data to the terminal on the basis of the indication information and the reference signal.

Reference Signal for Downlink Precoding

Figure 24:
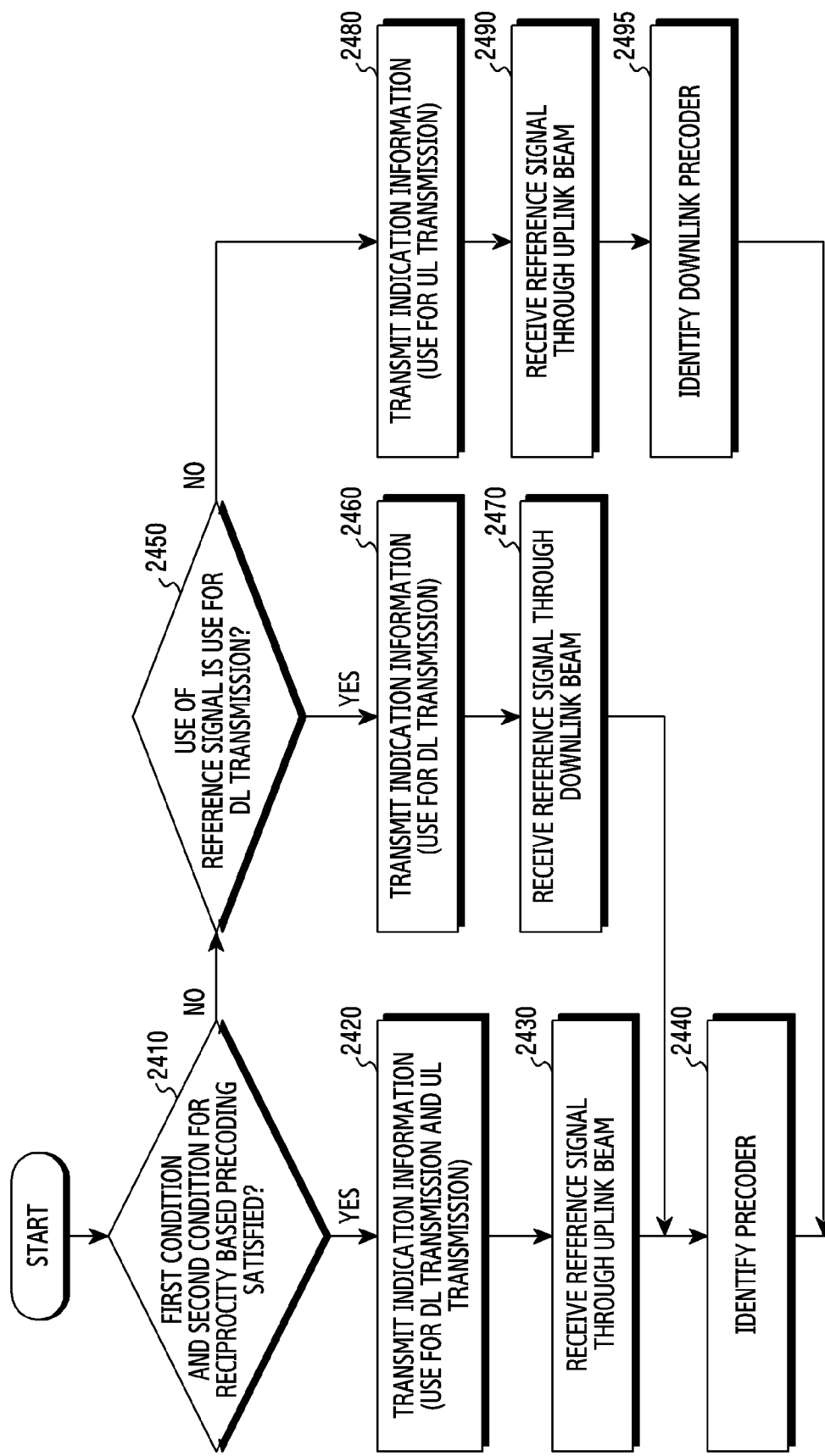
FIG. 24 illustrates an operation flow of a base station for determining a beam of a reference signal for downlink transmission according to various embodiments of the present disclosure.
Figure 25:
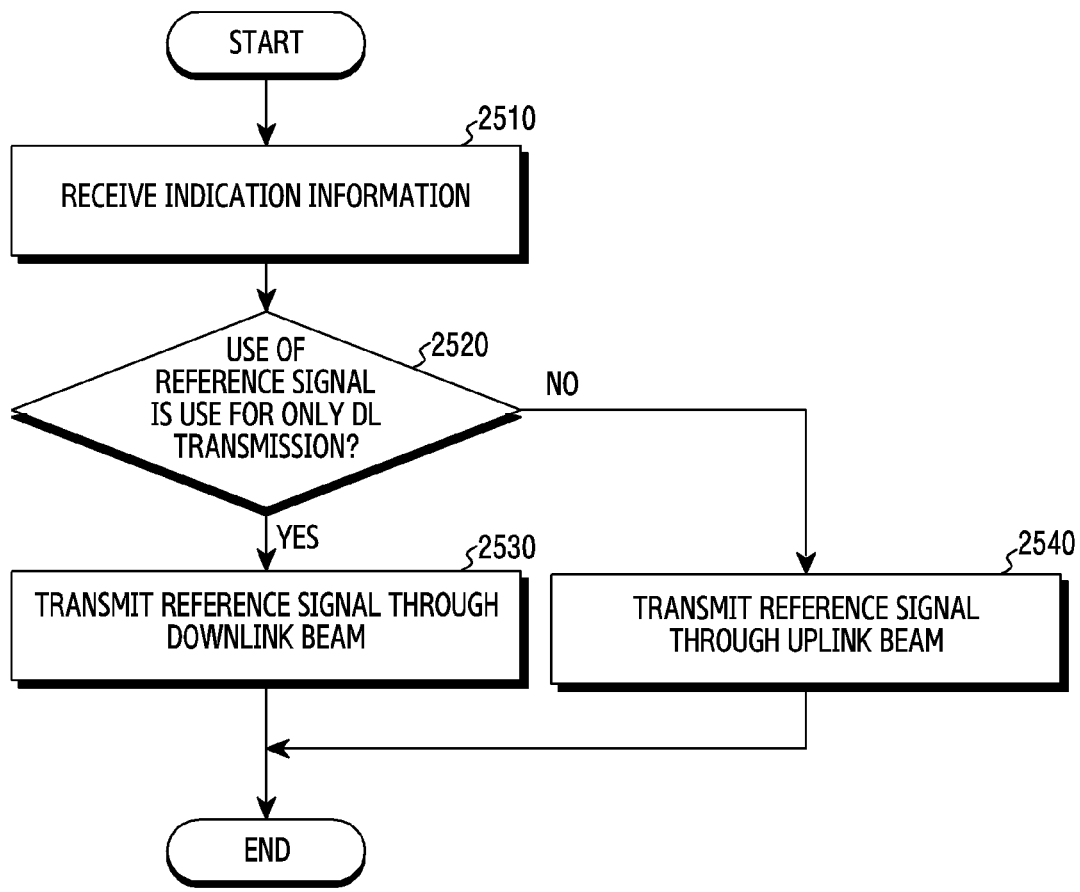
FIG. 25 illustrates an operation flow of a terminal for determining a beam of a reference signal for downlink transmission according to various embodiments of the present disclosure.

Below, in FIG. 23 to FIG. 25, a reference signal for downlink precoding is supported. Here, the reference signal may be an SRS. A reference signal used for uplink transmission, that is, for measurement of an uplink channel may be supported as it is. Besides this, in response to an uplink beam or a downlink beam being different from each other (e.g., the wireless network environment 500) or in response to a base station coupled through uplink with a terminal and a base station coupled through downlink being different from each other, the transmission of a reference signal for downlink precoding may be additionally supported. Here, in response to a reference signal for only downlink precoding being transmitted, for the sake of establishment of channel reciprocity, the corresponding reference signal may be transmitted by the terminal by using a downlink reception beam, and may be received by the base station by using a downlink transmission beam.

Figure 23:
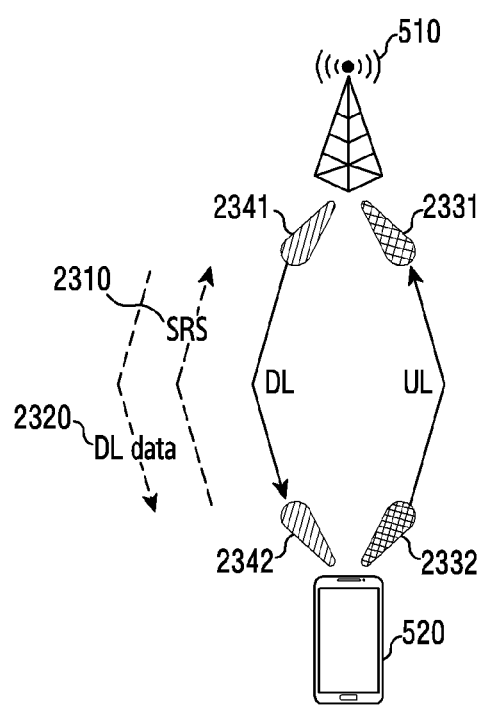
FIG. 23 illustrates an example of determining a beam of a reference signal downlink transmission according to various embodiments of the present disclosure.

FIG. 23 illustrates an example of determining a beam of a reference signal for downlink transmission according to various embodiments of the present disclosure. Referring to FIG. 23, the terminal 520 may transmit a reference signal (e.g., an SRS) to the base station 510 through a downlink beam (2310). In detail, the terminal 520 may use a downlink reception beam 2342 as a beam that will be used to transmit the reference signal. This operation means that the base station 510 uses, as a transmission beam, a beam indicated by the same index as an index corresponding to the downlink reception beam 2342. Here, it is assumed that the downlink reception beam 2342 and a downlink transmission beam 2341 are previously determined by a beam management procedure performed in the base station 510 and the terminal 520.

Although not illustrated in FIG. 23, undoubtedly, a reference signal for uplink transmission may be transmitted through an uplink beam (e.g., a beam 2331 and a beam 2332). Also, when the reference signal is utilizable for all uplink and downlink as when channel reciprocity is satisfied, the reference signal may be transmitted through any one of the downlink beam or the uplink beam.

The base station 510 may determine which beam to use for transmission of the reference signal. On the other hand, in response to the base station 510 using a downlink transmission beam 2341 for the sake of reception of a reference signal, the terminal 520 may use the downlink reception beam 2342 for the sake of transmission of the reference signal. In response to the base station 510 using the uplink reception beam 2331 for the sake of reception of the reference signal, the terminal 520 may use the uplink transmission beam 2332 for the sake of reception of the reference signal. Because the terminal 520 does not know an determined item, there is a need to notify the terminal 520 which beam the base station 510 uses for reception of the reference signal. Because a beam that will be used for downlink transmission is different according to through which beam the reference signal is transmitted, the indication formation notified to the terminal 520 may represent a use about which channel the transmission of the reference signal is used to measure among a downlink channel using a downlink beam and an uplink channel using an uplink beam. In detail, in accordance with a procedure illustrated in FIG. 24, the base station 510 may determine a beam that will receive a reference signal for downlink transmission, and transmit indication information representing the determined beam, to the terminal 520. FIG. 24 illustrates an operation flow of the base station 510 for determining the beam of the reference signal for downlink transmission according to various embodiments of the present disclosure.

In step 2410, the base station 510 may determine whether a first condition and a second condition for reciprocity-based preceding are satisfied. Step 2410 corresponds to step 810 of FIG. 8 and thus, a detailed description of step 2410 is omitted. In response to satisfying all of the first condition and the second condition, the base station 510 may perform step 2420. On the other hand, in response to failing to satisfy at least one of the first condition or the second condition, the base station 510 may perform step 2450.

In step 2420, the base station 510 may transmit indication information to the terminal 520. The indication information may represent that the measurement result of the transmitted uplink reference signal is utilizable for not only uplink transmission but also downlink transmission. Because the first condition and the second condition are all satisfied and thus channel reciprocity (and the beam correspondence) is satisfied, the measurement result of the uplink reference signal is utilizable even for downlink transmission.

In step 2430, the base station 510 may receive a reference signal from the terminal 520 through an uplink reception beam. In response to step 2430 being performed after step 2410, the beam correspondence and the channel reciprocity are satisfied and thus, an index of a downlink transmission beam and an index of an uplink reception beam may be the same as each other.

In step 2440, the base station 510 may calculate a downlink precoder on the basis of the reference signal received in step 2430. In response to step 2430 being performed after step 2410, the channel reciprocity is guaranteed and thus, the base station 510 may calculate a precoder for downlink transmission on the basis of an uplink reference signal.

In step 2450, the base station 510 may determine whether a use of the reference signal is a use for downlink transmission. In response to the downlink transmission being needed, the base station 510 may determine that the reference signal is the use for downlink transmission, and perform step 2460. To the contrary, in response to uplink transmission being required, the base station 510 may determine that the reference signal is the use for uplink transmission, and perform step 2480.

In step 2460, the base station 510 may transmit indication information to the terminal 520. The indication information may represent a use for downlink transmission. The use means not the original use of an uplink reference signal transmitted in the terminal 520, but a use for utilizing the uplink reference signal for the sake of downlink transmission, on the basis of the channel reciprocity. For applying of the reciprocity, the base station 510 may use not an uplink beam but a downlink beam.

In step 2470, the base station 510 may receive a reference signal from the terminal 520 through a downlink transmission beam, Because the channel reciprocity is not satisfied, the base station 510 may receive the reference signal transmitted from the terminal 520 through the downlink transmission beam 2341. This is because measurement of a downlink channel is required for downlink transmission in a next step. In accordance with the aforementioned description of step 2440, the base station 510 may calculate the downlink precoder on the basis of the reference signal received in step 2430.

In step 2480, the base station 510 may transmit indication information to the terminal 520. The indication information may represent a use for uplink transmission. The use means the original use (e.g., uplink channel estimation, scheduling) of the uplink reference signal transmitted in the terminal 520.

In step 2490, the base station 510 may receive a reference signal from the terminal 520 through an uplink reception beam.

In step 2495, the base station 510 may determine a downlink precoder, apart from the aforementioned operations step 2480 and step 2490). Although not illustrated in FIG. 24, the base station 510 may transmit a downlink reference signal (e.g., a CSI-RS) to the terminal 520, and receive a feedback of a CSI for this from the terminal 520. The base station 510 may determine, as the downlink precoder, a preceding matrix indicated by a PMI included in the CSI.

In the aforementioned step 2420, step 2460 and step 2480, the base station 510 may transmit the indication information to the terminal 520. Here, the indication information may be configured in various schemes. Also, in accordance with the configuration of the indication information, the terminal 520 may obtain the use of the reference signal in various schemes, and determine a transmission beam of the reference signal. In detail, the terminal 520 may obtain through which beam the reference signal has to be transmitted, on the basis of signaling (embodiment 1) with the base station 510 or a predefined pattern (embodiment 2).

Embodiment 1: Indication Information on Uplink/Downlink Utilization or Non-Utilization of Uplink Reference Signal The base station 510 may transmit indication information representing a use of a reference signal (e.g., an SRS) to the terminal 520. The use may be one of the following three uses.

Use 1: use for all of uplink and downlink transmission
Use 2: use for downlink transmission (below, DL CSI measurement)
Use 3: use for uplink transmission (below, UL CSI measurement)

In other words, the indication information may be indication information representing whether an uplink reference signal is utilizable for uplink or is utilizable for downlink. The indication information may represent one of the three uses, in a scheme similar with that of indication information representing whether a downlink reference signal is utilizable for uplink/downlink, depicted in FIG. 7 to FIG. 9. Also, the scheme of transmitting the indication information may be a scheme similar with that of the indication information representing whether the downlink reference signal is utilizable for uplink/downlink, depicted in FIG. 7 to FIG. 9, that is, a transmission scheme through DCI, a MAC CE, or higher layer signaling.

Embodiment 2: Pattern Related with Downlink Transmission

When non-codebook based downlink transmission is set by the base station 510, the next first reference signal (e.g., an SRS) is set to be utilizable for downlink transmission, and a next reference signal may be set to be utilizable for uplink transmission. The terminal 520 may transmit the first reference signal by using, as a transmission beam, the downlink reception beam 2342, and the base station 510 may receive the first reference signal by using, as a reception beam, the downlink transmission beam 2341. The next reference signal is transmitted through an uplink beam.

Additionally, the base station 510 may notify the terminal 520 whether the first reference signal is utilizable even for uplink transmission through 1-bit indication information, and notify the terminal 520 whether the next reference signal is utilizable even for downlink transmission through the 1-bit indication information in a similar manner. Through the embodiment 2, the number of bits consumed by separate indication information may be reduced.

In another alternative embodiment, the base station 510 may transmit resource information representing a predefined pattern, to the terminal 520, through separate signaling (e.g., DCI). Here, the resource information representing the predefined pattern may be information representing a pattern of a resource for identifying a reference signal utilizable for a use for uplink transmission among transmitted reference signals. The terminal 520 may transmit a reference signal corresponding to a corresponding resource by using, as a transmission beam, the downlink reception beam 2342, and the base station 510 may receive the reference signal by using, as a reception beam, the downlink transmission beam 2341.

In response to receiving indication information, the terminal 520 may determine through which beam to transmit a reference signal. The terminal 520 may determine a beam that will transmit the reference signal, according to a procedure illustrated in FIG. 25. FIG. 25 illustrates an operation flow of the terminal 520 for determining a beam of a reference signal for downlink transmission according to various embodiments of the present disclosure.

In step 2510, the terminal 520 may receive indication information from the base station 510. The indication information may be information representing a use of a reference signal that will be transmitted by the terminal 520.

In step 2520, the terminal 520 may determine whether the use of the reference signal indicated by the indication information is a use for only downlink transmission. In response to the use of the reference signal being the use for only downlink transmission, the terminal 520 may perform step 2530, and otherwise (e.g., a use for only uplink transmission or a use for all of uplink/downlink transmission), may perform step 2540.

In step 2530, in response to the use of the reference signal being the use for only downlink transmission, the terminal 520 may transmit the reference signal through a downlink reception beam. The reference signal is an uplink reference signal, but measurement for downlink transmission is required and thus, the terminal 520 may transmit the reference signal by using, as a transmission beam, the downlink reception beam 2342.

In step 2540, in response to the use of the use signal being the use for only uplink transmission or the use for all of uplink/downlink transmission, the terminal 520 may transmit the reference signal through an uplink transmission beam. By the uplink reference signal, measurement for uplink transmission is required and thus, the terminal 520 may transmit the reference signal through the uplink transmission beam 2332.

The base station 510 may measure a channel (below, a downlink channel) of downlink beams, from the uplink reference signal, and determine a precoder. By applying the determined precoder, the base station 510 may transmit downlink data to the terminal 520 (2320). In response to the reference signal used for determining of the precoder being transmitted through a downlink beam, even the uplink data may be transmitted through the downlink beam.

Uplink Beam Based Uplink Transmission

Figure 26:
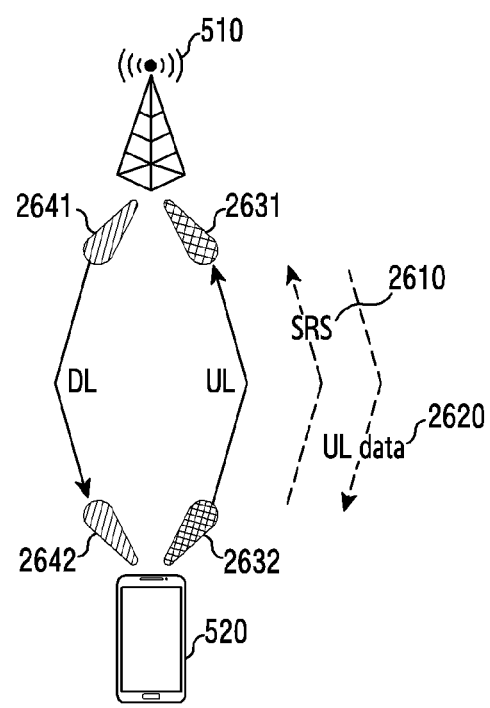
FIG. 26 illustrates an example of determining a beam for downlink transmission according to various embodiments of the present disclosure.
Figure 27:
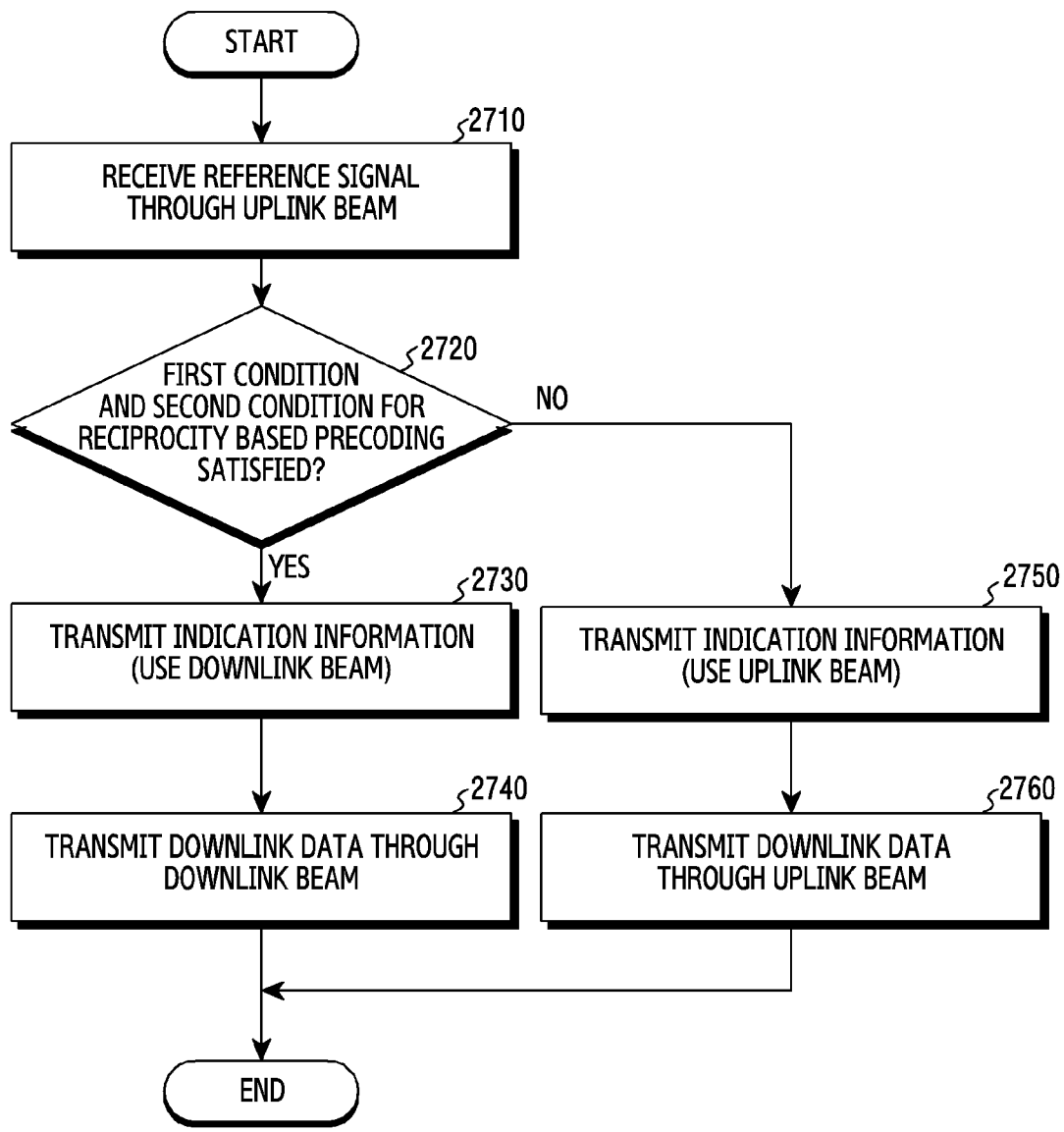
FIG. 27 illustrates an operation flow of a base station for determining a beam for downlink transmission according to various embodiments of the present disclosure.
Figure 28:
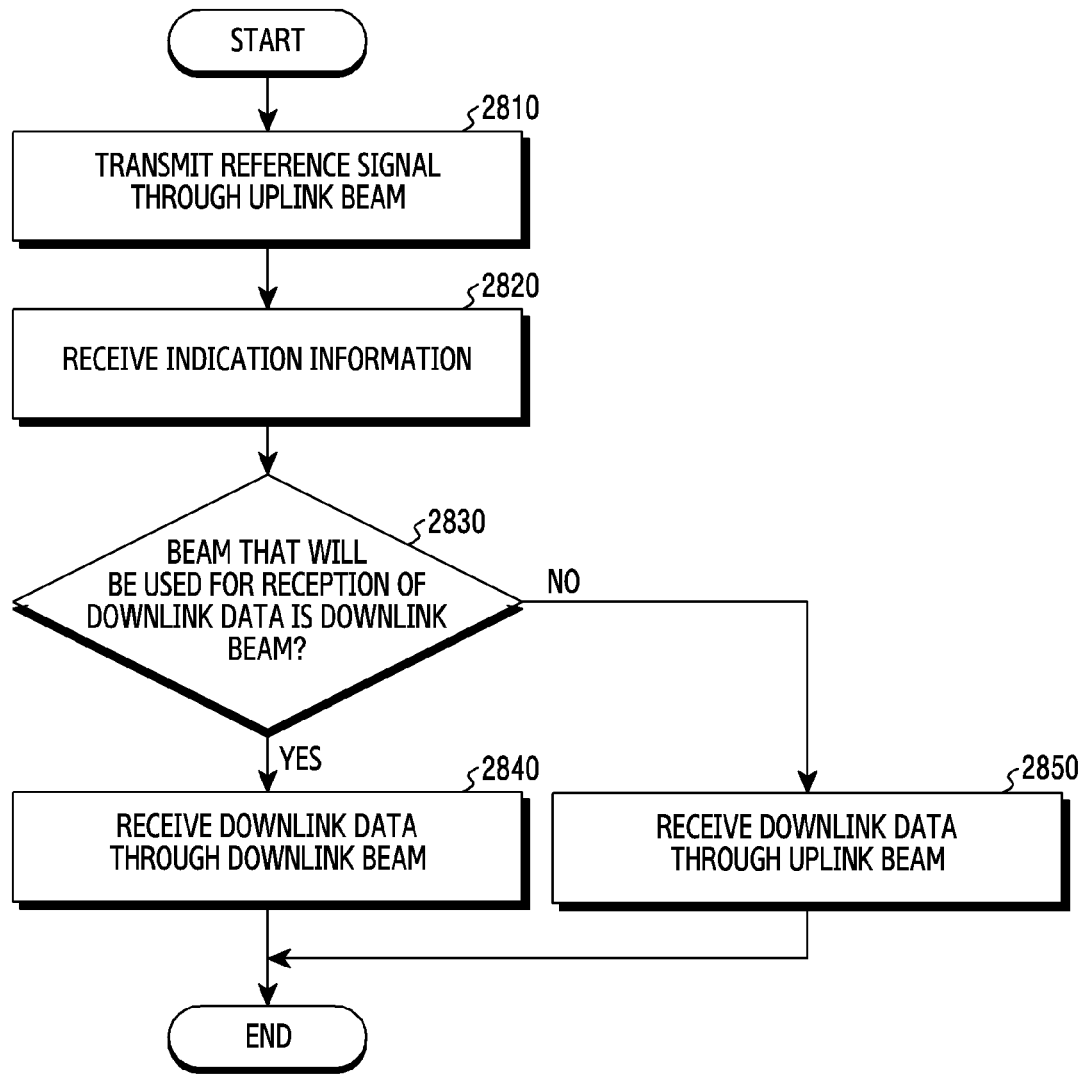
FIG. 28 illustrates an operation flow of a terminal for determining a beam for downlink transmission according to various embodiments of the present disclosure.

Below, FIG. 26 to FIG. 28 depict a way for utilizing a transmitted uplink reference signal for uplink transmission and downlink transmission, together. According to the way, in response to an uplink beam and a downlink beam being different, that is, in response to beam correspondence between a base station and a terminal not being satisfied, the base station may transmit downlink data by using the uplink beam. Here, unlike the way (altering of a beam of a reference signal) depicted in FIG. 23 to FIG. 25, the reference signal always presumes the transmission of a general uplink reference signal, that is, transmission through an uplink beam. Downlink data may be transmitted by using one of a downlink beam or an uplink beam according to the utilization or non-utilization of channel reciprocity.

FIG. 26 illustrates an example of determining a beam for downlink transmission according to various embodiments of the present disclosure. Referring to FIG. 26, the terminal 520 may transmit a reference signal to the base station 510 (2610). The reference signal may be an uplink reference signal (e.g., an SRS) for obtaining an uplink channel state. By applying a downlink reception beam 2642 as a transmission beam, the terminal 520 may transmit the reference signal.

In addition to transmission of the reference signal, the base station 510 may transmit indication information to the terminal 520 (2620). The indication information may be information representing a beam that will be used for downlink transmission of the base station 510 or information representing a beam that will be used for reception of downlink transmission of the terminal 520. The beam that will be used for downlink transmission of the terminal 520 may be a downlink beam (e.g., a beam 2642) or an uplink beam (e.g., a beam 2632).

The indication information may indicate one of uplink transmission using a downlink beam or uplink transmission using an uplink beam. The indication information may include at least one bit for representing a beam that will be used for downlink transmission. For example, in response to the indication information including 1-bit for representing the beam that will be used for downlink transmission, a 1-bit value '0' may indicate the downlink transmission using the downlink beam, and a 1-bit value '1' may indicate the downlink transmission using the uplink beam. Here, the 1-bit may be a value separately defined for applying reciprocity-based preceding.

In response to performing the downlink transmission on the basis of the indication information, the base station 510 may determine one of the uplink beam (e.g., the beam 2631) or the downlink beam (e.g., the beam 2641), to use the determined uplink beam or downlink beam as a transmission beam of the base station 510.

A scheme of transmitting the indication information may be one of a dynamic transmission scheme and a semi-static transmission scheme.

In some embodiments, the indication information may be transmitted through DCI. In other some embodiments, the indication information may be transmitted through a MAC CE. In further other some embodiments, the indication information may be transmitted through higher layer signaling. The indication information may be transmitted similarly with the scheme of transmitting the information representing the beam that will be used for uplink transmission, depicted in FIG. 10 to FIG. 12.

Below, a procedure of the base station 510 and the terminal 520 for determining the beam for downlink transmission described above is depicted in each of FIG. 27 and FIG. 28.

FIG. 27 illustrates an operation flow of the base station 510 for determining a beam for downlink transmission according to various embodiments of the present disclosure.

In step 2710, the base station 510 may receive an uplink reference signal through an uplink beam. The uplink beam may be the uplink reception beam 2631. Step 2710 may correspond to step 2610 of FIG. 26.

In step 2720, the base station 510 may determine whether a first condition and a second condition for reciprocity-based preceding are satisfied. Step 2720 corresponds to step 810 of FIG. 8 and thus, a detailed description of step 2720 is omitted. In response to satisfying all of the first condition and the second condition, the base station 510 may perform step 2730. On the other hand, in response to failing to satisfy at least one of the first condition or the second condition, the base station 510 may perform step 2750.

In step 2730, the base station 510 may transmit indication information to the terminal 520. Here, the indication information may indicate that a beam that will be used for downlink transmission is a downlink beam. The indication information may represent that downlink data is transmissible through the downlink beam. In an environment where beam correspondence is satisfied and channel reciprocity is guaranteed, the base station 510 may generate and transmit the indication information to the terminal 520, in order to represent that an uplink reference signal transmitted with an uplink channel can be used for obtaining state information of a downlink channel through the downlink beam.

In step 2740, the base station 510 may transmit downlink data to the terminal 520 by using, as a transmission beam, the uplink reception beam 2631.

In step 2750, the base station 510 may transmit indication information to the terminal 520. Here, the indication information may indicate that a beam that will be used for downlink transmission is an uplink beam. The indication information may represent that, because beam correspondence is not satisfied and channel reciprocity is not guaranteed, it is impossible to determine a downlink precoder through a downlink beam on the basis of an uplink reference signal.

In step 2760, the base station 510 may transmit downlink data to the terminal 520 by using, as a transmission beam, the uplink reception beam 2631.

The indication information transmitted in step 2730 and step 2750 is described as being transmitted after step 2710 being a procedure of receiving the reference signal in FIG. 27, but an embodiment is not limited to this. That is, the reception of the reference signal through the uplink beam of step 2710 may be performed after the transmission of the indication information as well. The indication information is for determining not a beam of the reference signal but a beam that will be used for uplink transmission and thus, the base station 510 is required to transmit the indication information to the terminal 520, before the terminal 520 determines a precoder from the reference signal and transmits uplink data by using the determined preceding.

On the other hand, in response to the received reference signal being aperiodic reference signal, an express request may be required and thus, the indication information may include information requesting the aperiodic reference signal. At this time, the operation of transmitting the indication information may be performed earlier than step 1110 being the operation of receiving the aperiodic reference signal.

FIG. 28 illustrates an operation flow of the terminal 520 for determining a beam for downlink transmission according to various embodiments of the present disclosure.

In step 2810, the terminal 520 may transmit an uplink reference signal to the base station 510. The uplink reference signal may be a reference signal for measuring an uplink channel state. For example, the uplink reference signal may be an SRS. The terminal 520 may transmit the uplink reference signal through the uplink transmission beam 2632.

The reference signal may be transmitted periodically according to setting, or be transmitted in response to a request from the base station 510.

In step 2820, the terminal 520 may receive indication information. The indication information may represent whether a reception beam that will be used for downlink transmission by the terminal 520 is a downlink reception beam (e.g., the beam 2642) or is an uplink transmission beam (e.g., the beam 2641). In FIG. 28, it is illustrated that step 2820 operates after step 2810, but an embodiment is not limited to this. As illustrated in FIG. 22, step 2230 of transmitting a reference signal may be performed earlier than step 2220 of transmitting indication information as well. On the other hand, in response to the transmission of the reference signal being triggered by the indication information, an operation of each of the base station 510 and the terminal 520 may be performed according to a sequence illustrated in FIG. 22.

In step 2830, the terminal 520 may determine whether a beam that will be used for uplink reception is a downlink beam (e.g., the beam 2642) from the indication information. In response to the beam that will be used for downlink reception being the downlink beam, the terminal 520 may perform step 2840. In response e beam that will be used for downlink reception being an uplink beam, the terminal 520 may perform step 2850.

In step 2840, the terminal 520 may receive downlink data through the downlink beam. The indication information of step 2820 indicates the downlink transmission through the downlink beam and thus, the terminal 520 may determine that channel reciprocity is utilizable from the indication information. The terminal 520 may receive the downlink data to which a precoder determined from a reference signal transmitted with uplink is applied. For the sake of the measurement result of a downlink channel, the terminal 520 may receive the downlink data, by using, as a reception beam, a beam (e.g., the beam 2642) corresponding to a transmission beam (e.g., the beam 2641) of the base station 510. On the other hand, the reciprocity is satisfied and thus, a downlink transmission beam and an uplink reception beam may indicate the same beam.

In step 2850, the terminal 520 may receive downlink data through the uplink beam. The terminal 520 may receive the downlink data, by using, as a reception beam, a beam of the same index as that of the uplink transmission beam 2632 determined in a beam management procedure.

The indication information transmitted from the base station to the terminal, depicted in FIG. 6 to FIG. 28, may be denoted as at least one of a reciprocity indicator, an RS beam indicator, a data beam indicator, uplink/downlink measurement indication information, and a transmission mode indicator, according to a concrete operation of embodiments as well.

On the other hand, the aforementioned embodiments describe that the content of each indication information is different, but the terminal may also recognize information that the base station actually intends to forward to the terminal, in aspect of reception from the same indication information. In some embodiments, the base station may transmit information notifying the utilization or non-utilization of channel reciprocity to the terminal. For example, the base station may notify, by 1-bit information, the terminal whether the channel reciprocity between the base station and the terminal can be utilized (whether the reciprocity is satisfied). The terminal may be set to receive the information notifying the utilization or non-utilization of the channel reciprocity, to perform a specific operation. For one example, the terminal may be set to use a downlink reception beam as a transmission beam at uplink transmission, in response to receiving the information notifying the reciprocity utilization or non-utilization.

By transmitting the indication information, the terminal may obtain information for utilizing the channel reciprocity with the base station. By obtaining the information, the terminal may perform an operation necessary for beams of base stations determined by a beam search procedure and utilization of the reciprocity. By utilizing the channel reciprocity, the base station and the terminal each may perform more accurate precoding compared with a precoding scheme quantized by a codebook. In detail, in downlink transmission, the base station may, not selecting one of precoders quantized with a specific number, measure an uplink reference signal and determine a non-quantized precoder, thereby performing precoding. Similarly, in uplink transmission, the terminal may measure a downlink reference signal and determine a non-quantized precoder, thereby performing precoding.

While a detailed description of the present disclosure has been made for a concrete embodiment, it is undoubted that various modifications are available without departing from the scope of the present disclosure. Therefore, the scope of the present disclosure should not be limited to and defined by the explained embodiment and should be defined by not only the scope of claims mentioned below but also equivalents to the scope of these claims.

And, embodiments disclosed in the specification and drawings only suggest specific examples so as to easily explain the content of the present disclosure and help understanding, and do not intend to limit the scope of the present disclosure. Accordingly, the scope of the present disclosure should be construed as including all modified or changed forms that are drawn on the basis of the technological spirit of the present disclosure, besides the embodiments disclosed herein.

What is claimed is:

1. A method performed by a terminal, the method comprising:
    identifying first beam information for a downlink transmission beam of a base station, second beam information for an uplink reception beam of the base station, third beam information for a downlink reception beam of the terminal, and fourth beam information for an uplink transmission beam of the terminal, based on an uplink beam search and a downlink beam search;
    receiving, from the base station, indication information that indicates whether a reference signal transmitted from the base station is used for an uplink data transmission or not;
    receiving, from the base station according to the fourth beam information, the reference signal transmitted according to the second beam information in case that the indication information indicates that the reference signal is used for the uplink data transmission; and
    transmitting uplink data to the base station according to the fourth beam information, based on an uplink precoder,
    wherein the uplink precoder is identified based on the reference signal,
    wherein the downlink transmission beam of the base station is different from the uplink reception beam of the base station, and
    wherein the downlink reception beam of the terminal is different from the uplink transmission beam of the terminal.

2. The method of claim 1, further comprising:
    receiving another reference signal used for a downlink data transmission according to the third beam information,
    identifying whether the uplink data according to one of the third beam information or the fourth beam information, based on the indication information, and
    transmitting the uplink data according to the third beam information based on another uplink precoder,
    wherein the another uplink precoder is identified based on the another reference signal, and
    wherein the indication information further includes information indicating the fourth beam information among the third beam information and the fourth beam information is used for transmission of the uplink data of the terminal.

3. The method of claim 1, wherein transmitting the uplink data further comprises:
    in response to a precoding scheme of the terminal being based on uplink measurement, applying, to the uplink data, a precoder of a precoding matrix indicator (PMI) transmitted from the base station to the terminal; and
    in response to the precoding scheme being based on downlink measurement, applying, to the uplink data, a precoder which is calculated based on a measurement result of the reference signal, and
    wherein the indication information further includes information that the precoding scheme is based on the uplink measurement.

4. The method of claim 1, further comprising receiving a precoding matrix indicator (PMI) from the base station,
    wherein transmitting the uplink data comprises:
        in response to the PMI indicating a precoder for reflecting an uplink interference, applying, to the uplink data, a precoder which is calculated based on a measurement result of the reference signal; and
        in response to the PMI indicating the uplink precoder, applying the uplink precoder to the uplink data, and
        wherein the indication information further includes information that the PMI indicates the uplink precoder.

5. The method of claim 1, wherein transmitting the uplink data further comprises applying, to the uplink data, a precoder which is identified according to a transmission scheme indicated based on the indication information, and
    wherein the indication information further includes information that the transmission scheme of the uplink data is a codebook based transmission scheme.

6. The method of claim 1, further comprising:
    an analog beamforming operation of forming a reception beam of the terminal for receiving the reference signal and a transmission beam of the terminal for transmitting the uplink data; and
    a digital beamforming operation of identifying a precoder that will be applied to the uplink data.

7. The method of claim 1, wherein the indication information is received from the base station through downlink control information (DCI), a medium access control (MAC) control element (CE), or higher layer signaling.

8. The method of claim 1, wherein the indication information includes 1 bit for indicating that the reference signal is used for the uplink data transmission.

9. The method of claim 1, further comprising, receiving resource information indicating a predetermined pattern,
    wherein the resource information indicates a pattern of a resource for identifying the reference signal.

10. A method performed by a base station, the method comprising:
- identifying first beam information for a downlink transmission beam of the base station, second beam information for an uplink reception beam of the base station, third beam information for a downlink reception beam of a terminal, and fourth beam information for an uplink transmission beam of the terminal, based on an uplink beam search and a downlink beam search;
- transmitting, to the terminal, indication information that indicates a reference signal transmitted from the terminal is used for a downlink data transmission or not;
- receiving, from the terminal according to the first beam information, a reference signal transmitted according to the third beam information in case that the indication information indicates that the reference signal is used for the downlink data transmission; and
- transmitting downlink data to the terminal according to the first beam information based on a downlink precoder,
- wherein the downlink precoder is identified based on the reference signal,
- wherein the downlink transmission beam of the base station is different from the uplink reception beam of the base station, and
- wherein the downlink reception beam of the terminal is different from the uplink transmission beam of the terminal.

11. The method of claim 10, further comprising:
- receiving another reference signal used for an uplink data transmission according to the second beam information
- identifying whether to transmit the downlink data according to one of the first beam information and the second beam information based on the indication information, and
- transmitting the downlink data according to the second beam information, based on the downlink precoder,
- wherein the downlink precoder is identified based on the another reference signal, and
- wherein the indication information further includes information indicating the first beam information among the first beam information and the second beam information is used for transmission of the downlink data of the terminal.

12. The method of claim 10, wherein the indication information includes 1 bit for indicating that the reference signal is used for the downlink data transmission.

13. The method of claim 10, further comprising,
- transmitting resource information indicating a predetermined pattern,
- wherein the resource information indicates a pattern of a resource of identifying the reference signal.

14. A terminal comprising:
- at least one transceiver; and
- at least one processor operatively coupled with the at least one transceiver,
- wherein the at least one processor is configured to:
  - identify first beam information for a downlink transmission beam of a base station, second beam information for an uplink reception beam of the base station, third beam information for a downlink reception beam of the terminal, and fourth beam information for an uplink transmission beam of the terminal, based on an uplink beam search and a downlink beam search;
  - receive, from the base station, indication information that indicates whether a reference signal transmitted from the base station is used for an uplink data transmission or not;
  - receive, from the base station, according to the fourth beam information, the reference signal transmitted according to the second beam information in case that the indication information indicates that the reference signal is used for the uplink data transmission; and
  - transmit uplink data to the base station according to the fourth beam information based on an uplink precoder, and
- wherein the uplink precoder is identified based on the reference signal,
- wherein the downlink transmission beam of the base station is different from the uplink reception beam of the base station, and
- wherein the downlink reception beam of the terminal is different from the uplink transmission beam of the terminal.

15. The terminal of claim 14, wherein the at least one processor is further configured to:
- receive another reference signal used for a downlink data transmission according to the third beam information,
- identify whether to transmit the uplink data according to one of the third beam information or the fourth beam information, based on the indication information, and
- transmit the uplink data according to the third beam information based on another uplink precoder,
- wherein the another uplink precoder is identified based on the another reference signal, and
- wherein the indication information further includes information indicating the fourth beam information among the third beam information and the fourth beam information is used for transmission of the uplink data of the terminal.

16. The terminal of claim 14, wherein the at least one processor is further configured to:
- in response to a precoding scheme of the terminal being based on uplink measurement, apply, to the uplink data, a precoder of a precoding matrix indicator (PMI) transmitted from the base station to the terminal; and
- in response to the precoding scheme being based on downlink measurement, apply, to the uplink data, a precoder which is calculated based on a measurement result of the reference signal, and
- wherein the indication information further includes information that the precoding scheme is based on the uplink measurement.

17. The terminal of claim 14, wherein the at least one processor is further configured to receive a precoding matrix indicator (PMI) from the base station,
- wherein the at least one processor is, to transmit the uplink data, configured to:
  - in response to the PMI indicating a precoder for reflecting an uplink interference, apply, to the uplink data, a precoder which is calculated based on a measurement result of the reference signal; and
  - in response to the PMI indicating the uplink precoder, apply the uplink precoder to the uplink data, and
- wherein the indication information further includes information that the PMI indicates the uplink precoder.

18. The terminal of claim 14, wherein the at least one processor is further configured to apply, to the uplink data, a precoder which is identified according to a transmission scheme indicated based on the indication information, and wherein the indication information further indicates information that the transmission scheme of the uplink data is a codebook based transmission scheme.

19. The terminal of claim 14, wherein the indication information includes 1 bit for indicating that the reference signal is used for the uplink data transmission.

20. The terminal of claim 14, wherein the at least one processor is further configured to receive resource information indicating a predetermined pattern,
   wherein the resource information indicates a pattern of a resource for identifying the reference signal.

\* \* \* \* \*